US012549920B2

(12) United States Patent
Freeman et al.

(10) Patent No.: US 12,549,920 B2
(45) Date of Patent: Feb. 10, 2026

(54) SPATIALIZED AUDIO RELATIVE TO A PERIPHERAL DEVICE

(71) Applicant: Bose Corporation, Framingham, MA (US)

(72) Inventors: Eric J. Freeman, Sutton, MA (US); David Avi Dick, Marlborough, MA (US); Wade P. Torres, Attleboro, MA (US); Daniel R. Tengelsen, Framingham, MA (US); Eric Raczka Bernstein, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/408,051

(22) Filed: Jan. 9, 2024

(65) Prior Publication Data

US 2024/0147183 A1 May 2, 2024

Related U.S. Application Data

(63) Continuation of application No. 17/713,147, filed on Apr. 4, 2022, now Pat. No. 11,871,209, which is a (Continued)

(51) Int. Cl.
*H04S 7/00* (2006.01)

(52) U.S. Cl.
CPC .......... *H04S 7/304* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 6,446,002 | B1 | 9/2002 | Barton |
| 7,305,097 | B2 | 12/2007 | Rosen et al. |

(Continued)

FOREIGN PATENT DOCUMENTS

| | | | |
|---|---|---|---|
| CN | 115735363 | A | 3/2023 |
| JP | 2010147529 | A | 7/2010 |

(Continued)

OTHER PUBLICATIONS

International Search Report and the Written Opinion of the International Searching Authority, International Patent Application No. PCT/US2021/071464, pp. 1-16, dated Feb. 24, 2022.

(Continued)

*Primary Examiner* — Qin Zhu
(74) *Attorney, Agent, or Firm* — Bond, Shoeneck & King, PLLC

(57) ABSTRACT

Techniques and devices are described for generating modified audio signals. The techniques include receiving an audio signal at a device, tracking a movement of the device, generating a first modified audio signal to spatialize the audio signal, generating a second modified audio signal to spatialize the audio signal, causing the first modified audio signal to be rendered using a first speaker of the device, and causing the second modified audio signal to be rendered using a second speaker of the device. In some cases, the first modified audio signal is generated using a first head-related transfer function (HRTF) and the movement of the device, and the second modified audio signal is generated using a second HRTF and the movement of the device, where the second HRTF is different from the first HRTF. Numerous variations and configurations will be apparent in view of this disclosure.

20 Claims, 11 Drawing Sheets

Related U.S. Application Data continuation of application No. 16/904,087, filed on Jun. 17, 2020, now Pat. No. 11,356,795.

(56) References Cited

U.S. PATENT DOCUMENTS

| | | | |
|---|---|---|---|
| 7,630,500 | B1 | 12/2009 | Beckman et al. |
| 8,325,936 | B2 | 12/2012 | Eichfeld et al. |
| 9,066,191 | B2 | 6/2015 | Strauss et al. |
| 9,075,127 | B2 | 7/2015 | Hess et al. |
| 9,215,545 | B2 | 12/2015 | Dublin et al. |
| 9,352,701 | B2 | 5/2016 | Vautin et al. |
| 9,445,197 | B2 | 9/2016 | Oswald et al. |
| 9,571,925 | B1 | 2/2017 | Fish |
| 9,674,630 | B2 | 6/2017 | Mateos Sole et al. |
| 9,706,327 | B2 | 7/2017 | Brannmark et al. |
| 9,743,187 | B2 | 8/2017 | Bender |
| 9,913,065 | B2 | 3/2018 | Vautin et al. |
| 9,955,261 | B2 | 4/2018 | Ojala et al. |
| 10,056,068 | B2 | 8/2018 | Oswald et al. |
| 10,057,679 | B2 | 8/2018 | Fish |
| 10,123,145 | B2 | 11/2018 | Vautin et al. |
| 10,694,286 | B2 | 6/2020 | Fish |
| 10,694,313 | B2 | 6/2020 | Zilberman et al. |
| 10,721,521 | B1 | 7/2020 | Robinson et al. |
| 10,812,926 | B2 | 10/2020 | Asada et al. |
| 11,202,137 | B1 | 12/2021 | Kemmerer et al. |
| 2005/0190936 | A1* | 9/2005 | Miura ..................... H04S 1/002 381/26 |
| 2007/0160217 | A1 | 7/2007 | Chun |
| 2008/0008342 | A1 | 1/2008 | Sauk |
| 2008/0101589 | A1 | 5/2008 | Horowitz et al. |
| 2008/0170730 | A1 | 7/2008 | Azizi et al. |
| 2008/0273708 | A1 | 11/2008 | Sandgren et al. |
| 2008/0273722 | A1 | 11/2008 | Aylward et al. |
| 2008/0273724 | A1 | 11/2008 | Hartung et al. |
| 2008/0304677 | A1 | 12/2008 | Abolfathi et al. |
| 2009/0046864 | A1 | 2/2009 | Mahabub et al. |
| 2009/0214045 | A1 | 8/2009 | Fukui et al. |
| 2010/0226499 | A1 | 9/2010 | De Bruijn et al. |
| 2010/0329466 | A1* | 12/2010 | Berge ....................... H04R 3/12 381/22 |
| 2012/0008806 | A1 | 1/2012 | Hess |
| 2012/0070005 | A1 | 3/2012 | Inou et al. |
| 2012/0093320 | A1 | 4/2012 | Flaks et al. |
| 2012/0140945 | A1 | 6/2012 | Harris |
| 2013/0041648 | A1 | 2/2013 | Osman |
| 2013/0121515 | A1 | 5/2013 | Hooley et al. |
| 2013/0194164 | A1 | 8/2013 | Sugden et al. |
| 2014/0153751 | A1 | 6/2014 | Wells |
| 2014/0198918 | A1 | 7/2014 | Li et al. |
| 2014/0314256 | A1 | 10/2014 | Fincham et al. |
| 2014/0334637 | A1 | 11/2014 | Oswald et al. |
| 2015/0092965 | A1 | 4/2015 | Umminger et al. |
| 2015/0119130 | A1 | 4/2015 | Lovitt |
| 2015/0208166 | A1 | 7/2015 | Raghuvanshi et al. |
| 2016/0100250 | A1 | 4/2016 | Baskin et al. |
| 2016/0140949 | A1 | 5/2016 | Fan et al. |
| 2016/0286316 | A1 | 9/2016 | Bleacher et al. |
| 2016/0360224 | A1 | 12/2016 | Laroche et al. |
| 2016/0360334 | A1 | 12/2016 | Wu et al. |
| 2017/0078820 | A1 | 3/2017 | Brandenburg et al. |
| 2017/0085990 | A1 | 3/2017 | Sladeczek et al. |
| 2017/0230749 | A1 | 8/2017 | Fish |
| 2017/0272890 | A1* | 9/2017 | Oh .......................... H04S 7/304 |
| 2017/0325043 | A1* | 11/2017 | Jot .......................... H04S 3/002 |
| 2018/0020312 | A1 | 1/2018 | Visser et al. |
| 2018/0077514 | A1 | 3/2018 | Lee et al. |
| 2018/0091922 | A1 | 3/2018 | Satongar et al. |
| 2018/0124513 | A1 | 5/2018 | Kim et al. |
| 2018/0146290 | A1 | 5/2018 | Christoph et al. |
| 2018/0220253 | A1 | 8/2018 | Kärkkäinen |
| 2018/0232471 | A1 | 8/2018 | Schissler et al. |
| 2019/0037334 | A1 | 1/2019 | Acharya |
| 2019/0058943 | A1 | 2/2019 | Fish |
| 2019/0104363 | A1 | 4/2019 | Vautin et al. |
| 2019/0187244 | A1 | 6/2019 | Riccardi et al. |
| 2019/0313201 | A1 | 10/2019 | Torres et al. |
| 2019/0357000 | A1 | 11/2019 | Karkkainen et al. |
| 2020/0037097 | A1 | 1/2020 | Torres et al. |
| 2020/0107147 | A1 | 4/2020 | Munoz et al. |
| 2020/0275207 | A1 | 8/2020 | Zilberman et al. |
| 2020/0413213 | A1 | 12/2020 | Konagai |
| 2021/0058730 | A1 | 2/2021 | Raghuvanshi |
| 2021/0084357 | A1 | 3/2021 | Tajik |
| 2021/0400417 | A1 | 12/2021 | Freeman et al. |
| 2022/0082688 | A1 | 3/2022 | Torres |
| 2023/0089225 | A1* | 3/2023 | Wang ...................... H04S 7/304 |

FOREIGN PATENT DOCUMENTS

| | | | |
|---|---|---|---|
| JP | 2013535861 | A | 9/2013 |
| JP | 2015050493 | A | 3/2015 |
| JP | 2020515959 | A | 5/2020 |
| WO | 2013061268 | A2 | 5/2013 |
| WO | 2018127901 | A1 | 7/2018 |
| WO | 2020035335 | A1 | 2/2020 |
| WO | 2021258102 | A1 | 12/2021 |
| WO | 2022061342 | A2 | 3/2022 |

OTHER PUBLICATIONS

International Search Report and the Written Opinion of the International Searching Authority, International Patent Application No. PCT/US2021/070709, pp. 1-11, dated Oct. 5, 2021.

International Search Report and the Written Opinion of the International Searching Authority, International Patent Application No. PCT/US2019/024618, pp. 1-15, dated Jun. 19, 2019.

Jot et al., "Augmented Reality Headphone Environment Rendering", Audio Engineering Society Conference Paper, 2016, pp. 1-6.

Vera Erbes et al., "Extending the closed form image source model for source directivity (Digital appendix)", Proceedings Daga 2018 Munich, Mar. 22, 2018 (Mar. 22, 2018), pp. 1298-1301, XP055685529, doi: 10.14279/depositonce-6724.

International Search Report and the Written Opinion of the International Searching Authority, International Patent Application No. PCT/US2020/053068, pp. 1-15, dated Dec. 4, 2020.

The First Office Action, Japanese Patent Application No. 2022-577723, dated Mar. 19, 2024, pp. 1-10, with pp. 1-5 being a translation.

Communication Pursuant to Article 94(3) EPC, European Patent Application No. 21739890.8, dated Nov. 15, 2024, pp. 1-7.

Non-Final Office Action, U.S. Appl. No. 18/173,606, dated Feb. 27, 2025, pp. 1-20.

The Second Office Action, Japan Patent Application No. 2022-577723, dated Aug. 28, 2024, pp. 1-10, with pp. 1-5 being a translation.

"Omnidirectional.", Sweetwater, Nov. 3, 1997, www.sweetwater.com/insync/omnidirectional/#:-:text=Speakers%20are%20omnidirectional%20if%20they,beam%E2%80%9D%20or%20be%20very%20directional. (Year: 1997).

Final Office Action, U.S. Appl. No. 18/408,051, dated Apr. 11, 2025, pp. 1-15.

International Preliminary Report On Patentability, International Patent Application No. PCT/US2020/053068, pp. 1-11, dated Apr. 5, 2022.

International Preliminary Report On Patentability, International Patent Application No. PCT/US2020/070709, pp. 1-7, dated Dec. 13, 2022.

International Preliminary Report On Patentability, International Patent Application No. PCT/US2021/0071464, pp. 1-13, dated Mar. 30, 2023.

Tajik et al., U.S. Appl. No. 62/631,418 (Year: 2018).

The International Search Report and the Written Opinion of the International Searching Authority, International Patent Application No. PCT/US2021/072012, pp. 1-14, dated Feb. 11, 2022.

(56) References Cited

OTHER PUBLICATIONS

The International Search Report and the Written Opinion of the International Searching Authority, International Patent Application No. PCT/US2021/072072, pp. 1-13, dated Mar. 10, 2022.

* cited by examiner

SPATIALIZED AUDIO RELATIVE TO A PERIPHERAL DEVICE

PRIORITY CLAIM

This application is a continuation of U.S. patent application Ser. No. 17/713,147, filed Apr. 4, 2022, which is a continuation of U.S. patent application Ser. No. 16/904,087, filed Jun. 17, 2020, granted as U.S. Pat. No. 11,356,795 on Jun. 7, 2022, where the entire contents of the aforementioned applications are hereby incorporated by reference.

BACKGROUND

Aspects and implementations of the present disclosure are generally directed to audio systems, for example, audio systems which include a peripheral device and a wearable audio device.

Audio systems, for example, augmented reality audio systems, may utilize a technique referred to as sound externalization to render audio signals to a listener to trick their mind into believing they are perceiving sound from physical locations within an environment. Specifically, when listening to audio, particularly audio through stereo headphones, many listeners perceive the sound as coming from "inside their head". Sound externalization refers to the process of simulating and rendering sounds such that they are perceived by the user as though they are coming from the surrounding environment, i.e. the sounds are "external" to the listener.

As these augmented reality audio systems are capable of being executed using mobile devices, simulating or externalizing sound sources at predetermined positions may not be desirable to some users.

SUMMARY OF THE DISCLOSURE

The present disclosure relates to audio systems, methods, and computer program products which include a wearable audio device and a peripheral device. The wearable audio device and the peripheral device are capable of determining their respective positions and/or orientations within an environment as well as their respective positions and/or orientations with respect to each other. Once the relative positions and orientations between, e.g., the wearable audio device and the peripheral device are known, virtual sound sources may be generated at fixed positions and orientations relative to the peripheral device such that any change in position and/or orientation of the peripheral device produces a proportional change in the position and/or orientation of the virtual sound sources. Additionally, one or more orders of reflected audio paths may be simulated for each virtual sound source to increase the sense of realism of the simulated sources. For instance, each sound path, e.g., direct sound paths, as well as the first order and second order reflected sound paths, can be produced by modifying the original audio signal using a plurality of left head-related transfer functions (HRTFs) and a plurality of right HRTFs to simulate audio as though it were perceived by the user's left and right ears, respectively, coming from each virtual sound source.

Thus, the disclosure includes audio systems, methods, and computer program products to produce spatialized and externalized audio that is "pinned" to the peripheral device. The systems, methods, and computer program products can utilize: 1) a means of tracking the user's head location and/or orientation; 2) means of tracking the location and/or orientation of the peripheral device; and, 3) a means of rendering spatialized audio signals where the locations of the virtual sound sources are anchored or pinned in some way to the peripheral device. This could include placing virtual sound sources to the virtual left and virtual right of the peripheral device for left and right channel audio signals. It can also include a discrete, extracted, or phantom center virtual sound source for center channel audio. The concepts disclosed herein also scale to additional channels, e.g., could include additional channels for implementation of virtual surround sound systems (e.g., virtual 5.1 or 7.1). The concepts can also include object-oriented rendering like, for example, the object-oriented rendering provided by Dolby Atmos systems, which can add virtual height channels to the virtual surround sound system (e.g., virtual 5.1.2 or 5.1.4).

In one example, a computer program product for simulating audio signals is provided, the computer program product including a set of non-transitory computer-readable instructions stored in a memory, the set of non-transitory computer-readable instructions being executable on a processor and are configured to: obtain or receive an orientation of a wearable audio device relative to a peripheral device within an environment; generate a first modified audio signal, wherein the first modified audio signal is modified using a first head-related transfer function (HRTF) based at least in part on the orientation of the wearable audio device relative to the peripheral device; generate a second modified audio signal, wherein the second modified audio signal is modified using a second head-related transfer function (HRTF) based at least in part on the orientation of the wearable audio device relative to the peripheral device; send the first modified audio signal and the second modified audio signal to the wearable audio device, wherein the first modified audio signal is configured to be rendered using a first speaker of the wearable audio device and the second modified audio signal is configured to be rendered using a second speaker of the wearable audio device.

In one aspect, the set of non-transitory computer readable instructions are further configured to: obtain or receive a position of the wearable audio device relative to a position of the peripheral device within the environment and wherein modifying the first modified audio signal and modifying the second modified audio signal include attenuation based at least in part on a calculated distance between the position of the wearable audio device and the position of the peripheral device.

In one aspect, the set of non-transitory computer readable instructions are further configured to: obtain or receive an orientation of the peripheral device relative to the wearable audio device, wherein the first HRTF and the second HRTF are based in part on the orientation of the peripheral device relative to the wearable device.

In one aspect, the first modified audio signal and the second modified audio signal are configured to simulate a first direct sound originating from a first virtual sound source proximate a center of the peripheral device.

In one aspect, generating the first modified audio signal and generating the second modified audio signal include simulating a first direct sound originating from a first virtual sound source proximate a position of the peripheral device within the environment and simulating a second direct sound originating from a second virtual sound source proximate the position of the peripheral device.

In one aspect, generating the first modified audio signal and generating the second modified audio signal include simulating surround sound.

In one aspect, generating the first modified audio signal and generating the second modified audio signal includes using the first HRTF and the second HRTF, respectively, for only a subset of all available audio frequencies and/or channels.

In one aspect, the first HRTF and the second HRTF are further configured to utilize localization data from a localization module within the environment corresponding to locations of a plurality of acoustically reflective surfaces within the environment.

In one aspect, generating the first modified audio signal includes simulating a first direct sound originating from a first virtual sound source proximate the peripheral device and simulating a primary reflected sound corresponding to a simulated reflection of the first direct sound off of a first acoustically reflective surface of the plurality of acoustically reflective surfaces.

In one aspect, generating the first modified audio signal includes simulating a secondary reflected sound corresponding to a simulated reflection of the primary reflected sound off of a second acoustically reflective surface of the plurality of acoustically reflective surfaces.

In one aspect, the first modified audio signal and the second modified audio signal correspond to video content displayed on the peripheral device.

In one aspect, the orientation of the wearable audio device relative to the peripheral device is determined using at least one sensor, wherein the at least one sensor is located on, in, or in proximity to the wearable audio device or the peripheral device, and the at least one sensor is selected from: a gyroscope, an accelerometer, a magnetometer, a global positioning sensor (GPS), a proximity sensor, a microphone, a lidar sensor, or a camera.

In another example, a method of simulating audio signals is provided, the method including: receiving, via a wearable audio device from a peripheral device, a first modified audio signal, wherein the first modified audio signal is modified using a first head-related transfer function (HRTF) based at least in part on an orientation of the wearable audio device relative to the peripheral device; receiving, via the wearable audio device from the peripheral device, a second modified audio signal, wherein the second modified audio signal is modified using a second head-related transfer function (HRTF) based at least in part on the orientation of the wearable audio device relative to the peripheral device; rendering the first modified audio signal using a first speaker of the wearable audio device; and rendering the second modified audio signal using a second speaker of the wearable audio device.

In an aspect, the method further includes: obtaining a position of a wearable audio device relative to the peripheral device within an environment and wherein modifying the first modified audio signal and modifying the second modified audio signal are based at least in part on a calculated distance between the position of the wearable audio device and a position of the peripheral device.

In an aspect, the method further includes obtaining an orientation of the peripheral device relative to the wearable audio device, wherein the first HRTF and the second HRTF are based in part on the orientation of the peripheral device.

In an aspect, the first modified audio signal and the second modified audio signal are configured to simulate a first direct sound originating from a first virtual sound source proximate a center of the peripheral device.

In an aspect, rendering the first modified audio signal and rendering the second modified audio signal include simulating a first direct sound originating from a first virtual sound source proximate a position of the peripheral device within the environment and simulating a second direct sound originating from a second virtual sound source proximate the position of the peripheral device.

In one aspect, generating the first modified audio signal and generating the second modified audio signal include simulating surround sound.

In one aspect, generating the first modified audio signal and generating the second modified audio signal includes using the first HRTF and the second HRTF, respectively, for only a subset of all available audio frequencies and/or channels.

In an aspect, the method further includes receiving localization data from a localization module within the environment; and determining locations of a plurality of acoustically reflective surfaces within the environment based on the localization data.

In an aspect, rendering the first modified audio signal includes simulating a first direct sound originating from a first virtual sound source proximate the peripheral device and simulating a primary reflected sound corresponding to a simulated reflection of the first direct sound off of a first acoustically reflective surface of the plurality of acoustically reflective surfaces.

In an aspect, rendering the first modified audio signal includes simulating a secondary reflected sound corresponding to a simulated reflection of the primary reflected sound off of a second acoustically reflective surface of the plurality of acoustically reflective surfaces.

In an aspect, the peripheral device includes a display configured to display video content associated with the first modified audio signal and second modified audio signal.

In an aspect, the orientation of the wearable audio device relative to the peripheral device is determined using at least one sensor, wherein the at least one sensor is located on, in, or in proximity to the wearable audio device or the peripheral device, and the at least one sensor is selected from: a gyroscope, an accelerometer, a magnetometer, a global positioning sensor (GPS), a proximity sensor, a microphone, a lidar sensor, or a camera.

In a further example, an audio system for simulating audio is provided, the system including a peripheral device configured to obtain or receive an orientation of a wearable audio device relative to the peripheral device within an environment, the peripheral device further configured to generate a first modified audio signal using a first head-related transfer function (HRTF) based on the orientation of the wearable audio device with respect to the peripheral device and generate a second modified audio signal using a second head-related transfer function (HRTF) based on the orientation of the wearable audio device with respect to the peripheral device; and, the wearable audio device. The wearable audio device includes a processor configured to receive the first modified audio signal and receive the second modified audio signal; a first speaker configured to render the first modified audio signal using the first speaker; and a second speaker configured to render the second modified audio signal using the second speaker.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to audio systems, methods, and computer program products which include a wearable audio device (e.g., headphones or earbuds) and a peripheral device, such as a mobile peripheral device (e.g., a smartphone or tablet computer). The wearable audio device and the peripheral device are capable of determining their respective positions and/or orientations within an environment as well as their respective positions and/or orientations with respect to each other. Once the relative positions and orientations between, e.g., the wearable audio device and the peripheral device are known, virtual sound sources may be generated at fixed positions and orientations relative to the peripheral device such that any change in position and/or orientation of the peripheral device produces a proportional change in the position and/or orientation of the virtual sound sources. Additionally, one or more orders of reflected audio paths (e.g., first order, and optionally also second order) may be simulated for each virtual sound source to increase the sense of realism of the simulated sources. Each sound path, e.g., direct sound paths, as well as the orders of reflected sound paths (e.g., the first order, and optionally the second order), can be produced by modifying the original audio signal using a plurality of left head-related transfer functions (HRTFs) and a plurality of right HRTFs to simulate audio as though it were perceived by the user's left and right ears, respectively, coming from each virtual sound source.

Figure 1:
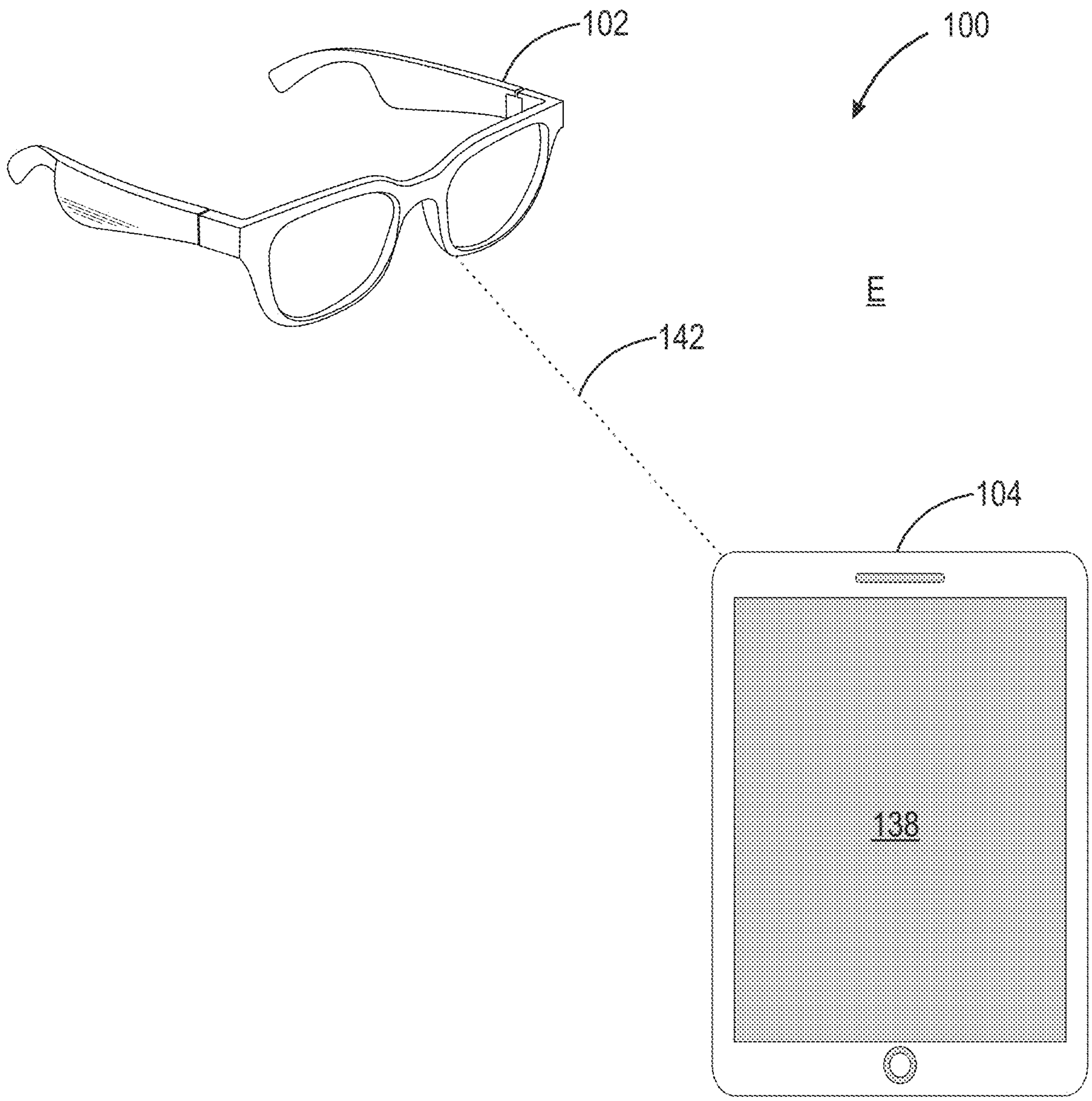
FIG. 1 is a schematic perspective view of an audio system according to the present disclosure.

The term "wearable audio device", as used in this application, in addition to its ordinary meaning to those with skill in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy, which could utilize air conduction and/or bone conduction techniques. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an audio eyeglasses form factor, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

The term "head related transfer function" or acronym "HRTF" as used herein, in addition to its ordinary meaning to those with skill in the art, is intended to broadly reflect any manner of calculating, determining, or approximating the binaural sound that a human ear perceives such that the listener can approximate the sound's position of origin in space. For example, a HRTF may be a mathematical formula or collection of mathematical formulas that can be applied or convolved with an audio signal such that a user listening to the modified audio signal can perceive the sound as originating at a particular point in space. These HRTFs, as referred to herein, may be generated specific to each user, e.g., taking into account that user's unique physiology (e.g., size and shape of the head, ears, nasal cavity, oral cavity, etc.). Alternatively, it should be appreciated that a generalized HRTF may be generated that is applied to all users, or a plurality of generalized HRTFs may be generated that are applied to subsets of users (e.g., based on certain physiological characteristics that are at least loosely indicative of that user's unique head related transfer function, such as age, gender, head size, ear size, or other parameters). In one example, certain aspects of the HRTFs may be accurately determined, while other aspects are roughly approximated (e.g., accurately determines the inter-aural delays, but coarsely determines the magnitude response).

The following description should be read in view of FIGS. 1-9. FIG. 1 is a schematic view of audio system 100 according to the present disclosure. Audio system 100 includes a wearable audio device 102 and a peripheral device 104. Wearable audio device 102 is intended to be a device capable of receiving an audio signal, e.g., modified audio signals 146A-146B (shown in FIGS. 2A and 2B) discussed below, and producing or rendering that signal into acoustic energy within environment E and proximate a user or wearer's ear. In one example, as illustrated in FIG. 1, wearable audio device 102 comprises an eyeglass form factor audio device capable of rendering acoustic energy outside of and proximate to a user's ear. It should be appreciated that, in other examples, wearable audio device 102 can be selected from over-ear or in-ear headphones, earphones, earpieces, a headset, earbuds, or sport headphones. Peripheral device 104 can be selected from any electronic device capable of generating and/or transmitting an audio signal, e.g., modified audio signals 146A-146B discussed below, to a separate device, e.g., wearable audio device 102. In one example, as illustrated in FIGS. 1 and 3-9, peripheral device 104 is intended to be a tablet. However, it should be appreciated that peripheral device 104 can be selected from a smart phone, a laptop or personal computer, a case configured to matingly engage with and/or charge the wearable audio device 102, or any other portable and/or movable computational device.

Figure 2A:
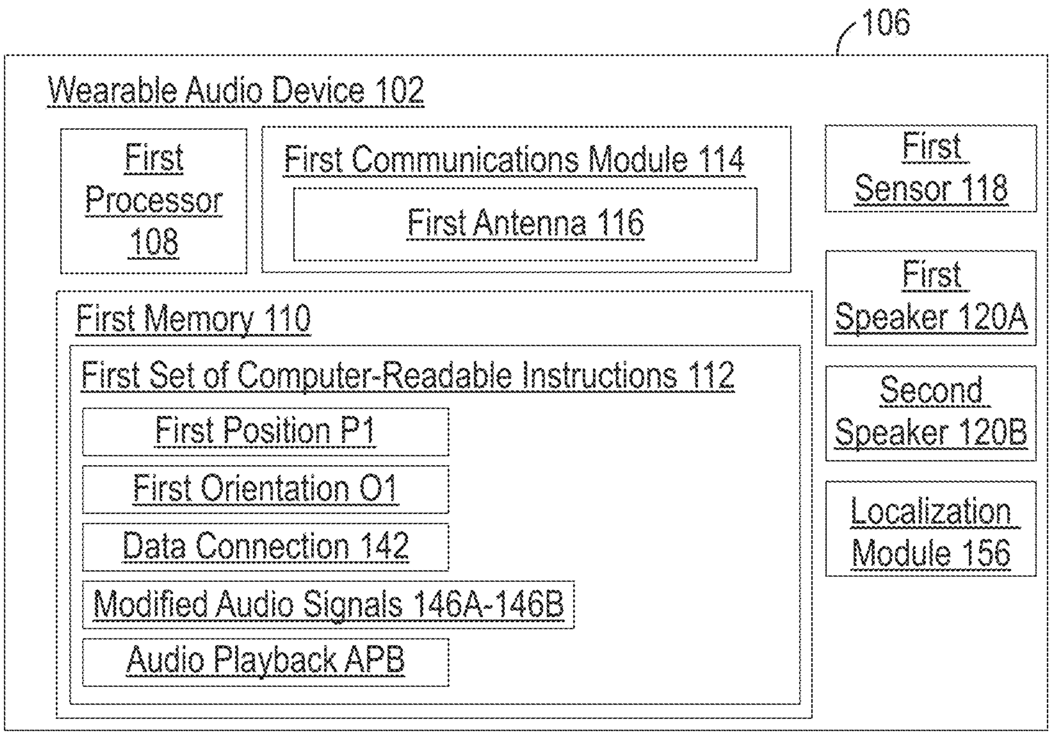
FIG. 2A is a schematic representation of the components of a wearable audio device according to the present disclosure.

As illustrated in FIG. 2A, wearable audio device 102 further includes first circuitry 106. First circuitry 106 includes a first processor 108 and a first memory 110 configured to execute and store, respectively, a first set of non-transitory computer-readable instructions 112 to perform the various functions of first circuitry 106 and wearable audio device 102 as described herein. First circuitry 106 further includes a first communications module 114 configured to send and/or receive data, e.g., audio data, via a wired or wireless connection, e.g., data connection 142 (discussed below) with peripheral device 104. In some examples, the audio data sent and/or received includes modified audio signals 146A-146B discussed below. It should be appreciated that first communications module 114 can further include a first antenna 116 for the purpose of sending and/or receiving the data discussed above. Furthermore, although not illustrated, it should be appreciated that wearable audio device 102 can include a battery, capacitor, supercapacitor, or other power source located on, in, or in electronic communication with first circuitry 106.

First circuitry 106 also includes at least one sensor, i.e., first sensor 118. First sensor 118 can be located on, in, or in communication with wearable audio device 102. First sensor 118 is a selected from at least one of: a gyroscope, an accelerometer, a magnetometer, a global positioning sensor (GPS), a proximity sensor, a microphone or plurality of microphones, a camera or plurality of cameras (e.g., front and rear mounted cameras), or any other sensor device capable of obtaining at least one of: a first position P1 of wearable audio device 102 within environment E, a first position P1 relative to peripheral device 104; a first orientation O1 of the wearable audio device 102 relative to environment E; a first orientation O1 of the wearable audio device 102 relative to peripheral device 104; or the distance between wearable audio device 102 and peripheral device 104. First position P1 and first orientation O1 will be discussed below in further detail. Furthermore, first circuitry 106 can also include at least one speaker 120. In one example, first sensor 118 is a camera or plurality of cameras, e.g., front and rear-mounted cameras, that are capable of obtaining image data of the environment E and/or the relative location and orientation of peripheral device 104 as will be discussed below. In one example, first circuitry 106 includes a plurality of speakers 120A-120B configured to receive an audio signal, e.g., modified audio signals 146A-146B (discussed below) and generate an audio playback APB to produce audible acoustic energy associated with the audio signal proximate a user's ear.

Figure 2B:
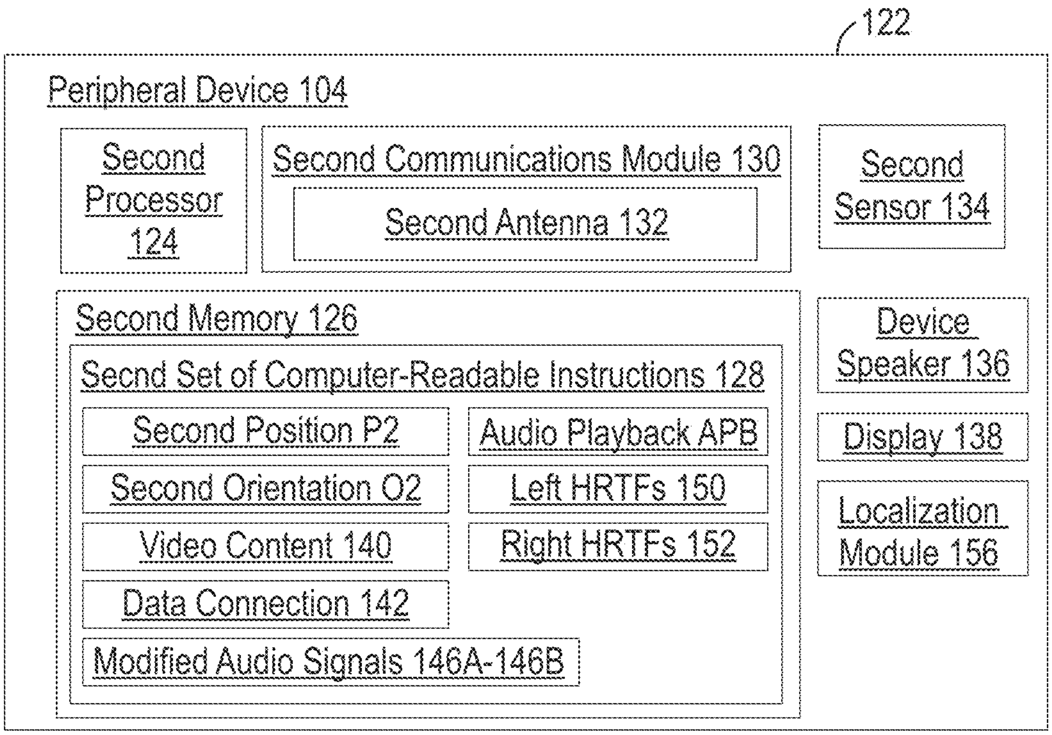
FIG. 2B is a schematic representation of the components of a peripheral device according to the present disclosure.

As illustrated in FIG. 2B, peripheral device 104 further includes second circuitry 122. Second circuitry 122 includes a second processor 124 and a second memory 126 configured to execute and store, respectively, a second set of non-transitory computer-readable instructions 128 to perform the various functions of second circuitry 122 and peripheral device 104 as described herein. Second circuitry 122 further includes a second communications module 130 configured to send and/or receive data, e.g., audio data, via a wired or wireless connection with wearable audio device 102 (discussed below) and/or with a device capable of connecting to the internet, e.g., a local router or cellular tower. In some examples, the audio data sent and/or received includes modified audio signals 146A-146B discussed below. It should be appreciated that second communications module 130 can further include a second antenna 132 for the purpose of sending and/or receiving the data discussed above. Furthermore, although not illustrated, it should be appreciated that peripheral device 104 can include a battery, capacitor, supercapacitor, or other power source located on, in, or in electronic communication with second circuitry 122.

Second circuitry 122 can also include at least one sensor, i.e., second sensor 134. Second sensor 134 can be located on, in, or in communication with peripheral device 104. Second sensor 134 is selected from at least one of: a gyroscope, an accelerometer, a magnetometer, a global positioning sensor (GPS), a proximity sensor, a microphone, a camera or plurality of cameras (e.g., front and rear cameras), or any other sensor device capable of obtaining at least one of: a second position P2 of peripheral device 104 within environment E, a second position P2 relative to wearable audio device 102; a second orientation O2 of the peripheral device 104 relative to environment E; a second orientation O2 of the peripheral device 104 relative to wearable audio device 102; or the distance between wearable audio device 102 and peripheral device 104. Second position P2 and second orientation O2 will be discussed below in further detail. In one example, second sensor 134 is a camera or plurality of cameras, e.g., front and rear-mounted cameras, that are capable of obtaining image data of the environment E and/or the relative location and orientation of wearable audio device 102 as will be discussed below.

Furthermore, second circuitry 122 can also include at least one device speaker 136, and a display 138. In one example, at least one device speaker 136 is configured to receive an audio signal or a portion of an audio signal, e.g., modified audio signals 146A-146B (discussed below) and generate an audio playback APB to produce audible acoustic energy associated with the audio signal at the second position P2 of the peripheral device 104 at a fixed distance from the wearable audio device 102. Display 138 is intended to be a screen capable of displaying video content 140. In one example, display 138 is a Liquid-Crystal Display (LCD) and may also include touch-screen functionality, e.g., is capable of utilizing resistive or capacitive sensing to determine contact with, and position of, a user's finger against the screen surface. It should also be appreciated that display 138 can be selected from at least one of: a Light-Emitting Diode (LED) screen, an Organic Light-Emitting Diode (OLED) screen, a plasma screen, or any other display technology capable of presenting pictures or video, e.g., video content 140, to a viewer or user.

As mentioned above, wearable audio device 102 and/or peripheral device 104 are configured to obtain their respective positions and orientations within environment E and/or relative to each other using first sensor 118 and second sensor 134, respectively. In one example environment E is a room, e.g., a space defined by a floor surrounded by at least one wall and capped by a ceiling or roof and within which single positions can be modeled and defined by a three-dimensional Cartesian coordinate system as having X, Y, and Z, positions within the defined space associated with a length dimension, a width dimension, and a height dimension, respectively. Therefore, obtaining first position P1 of wearable audio device 102 can be absolute within environment E, e.g., defined purely by its Cartesian coordinate within the room, or can be relative to the position of the other device, i.e., peripheral device 104.

Similarly, each device can obtain its own orientation defined by a respective yaw, pitch, and roll within a spherical coordinate system with an origin point at the center of each device, where yaw includes rotation about a vertical axis through the device and orthogonal to the floor beneath the device, pitch includes rotation about a first horizontal axis orthogonal to the vertical axis and extending from the at least one wall of the room, and roll includes rotation about a second horizontal axis orthogonal to the vertical axis and the first horizontal axis. In one example, where first orientation O1 of wearable audio device 102 and second orientation O2 of peripheral device 104 are defined relative to each other, each device may determine a vector representative of a relative elevation between each device and a relative azimuth angle, which are based in part on the yaw, pitch, and roll of each device. It should also be appreciated that first orientation O1 and second orientation O2 can also be obtained absolutely within environment E, e.g., with respect to a predetermined and/or fixed position within environment E.

As mentioned above, the respective circuitries of the devices of audio system 100, e.g., first circuitry 106 of wearable audio device 102 and second circuitry 122 of peripheral device 104, are capable of establishing, and sending and/or receiving wired or wireless data over, a data connection 142. For example, first antenna 116 of first communication module 114 is configured to establish data connection 142 with second antenna 132 of second communications module 130. Data connection 142 can utilize one or more wired or wireless data protocols selected from at least one of: Bluetooth, Bluetooth Low-Energy (BLE) or LE Audio, Radio Frequency Identification (RFID) communications, Low-Power Radio frequency transmission (LP-RF), Near-Field Communications (NFC), or any other protocol or communication standard capable of establishing a permanent or semi-permanent connection, also referred to as paired connection, between first circuitry 106 and second circuitry 122. It should be appreciated that data connection 142 can be utilized by first circuitry 106 of wearable audio device 102 and second circuitry 122 of peripheral device 104 to send and/or receive data relating to the respective positions and orientations of each device as discussed above, e.g., first position P1, second position P2, first orientation O1, second orientation O2, and the distance between devices, such that each device can be aware of the position and orientation of itself and/or the other devices within audio system 100. Additionally, as mentioned above, data connection 142 can also be used to send and/or receive audio data, e.g., modified audio signals 146A-146B (discussed below) between the devices of audio system 100.

In addition to the ability to obtain respective positions and orientations of each device of audio system 100, audio system 100 is also configured to render externalized sound to the user within environment E, using, for example, modified audio signals 146A-146B (discussed below) that have been filtered or modified using at least one head-related transfer function (HRTF) (also discussed below). In one example of audio system 100, sound externalization for use in augmented reality audio systems and programs is achieved by modeling an environment E, creating virtual sound sources at various positions within environment E, e.g., virtual sound sources 144A-144G (collectively referred to as "plurality of virtual sound sources 144" or "virtual sound sources 144"), and modeling or simulating sound waves and their respective paths from the virtual sound sources 144 (shown in FIGS. 3-9) to the position of the user's ears to simulate to the user perception of sound as though the virtual sound sources 144 were real or tangible sound sources, e.g., a physical speaker located at each virtual sound source position. For each modeled or simulated sound path, computational processing is used to apply or convolve at least one pair of HRTFs (one associated with the left ear and one associated with the right ear) to audio signals to generate modified audio signals 146A-146B. Once the HRTFs have been applied and the modified audio signals 146A-146B are generated, the modified audio signals 146A-146B can be played through a plurality of speakers 120A-120B (left and right speakers) of the wearable device 102 to trick the user's mind into thinking they are perceiving sound from an actual externalized source located at the positions of the respective virtual sound sources 144. As will be explained below, the quality of the simulated realism of these modified audio signals 146A-146B can increase by simulating first order and second order acoustic reflections from each virtual sound source within environment E, as well as attenuating or delaying the simulated signals to approximate time-of-flight of propagation of a sound signal through air. It should be appreciated that either wearable audio device 102 and/or peripheral device 104 can process, apply, or convolve the HRTFs to simulate the virtual sound sources as will be discussed herein. However, as the form factor, and therefore space for additional processing components, is typically limited in wearable audio devices, e.g., wearable audio device 102, it should also be appreciated that the application or convolution of the HRTFs with the audio signals discussed is likely to be achieved by the circuitry of peripheral device 104 and then modified audio signals 146A-146B can be sent or streamed to wearable audio device to be rendered as audio playback APB.

In some examples, the positions of each virtual sound source of plurality of virtual sound sources 144 with respect to the position of the wearable audio device 102 can be utilized to calculate and simulate a respective plurality of direct sound paths 148A-148G (collectively referred to as "plurality of direct sound paths 148" or "direct sound paths 148"), i.e., at least one direct sound path 148 from each virtual sound source 144 directly to the user's ears. Each sound path can be associated with a calculated distance (e.g., calculated distance D1 shown in FIG. 3 and calculated distances D2-D3 shown in FIGS. 5 and 7) of the respective direct sound path 148 from the virtual sound source 144 to the wearable audio device 102. As real sound wave propagation dissipates as a function of distance or radius from the origin point, the calculated distances can be used by the HRTFs to attenuate and/or delay the sound signals as a function of the calculated distance, e.g., as 1/distance for each sound path discussed herein. For every direct sound path 148, audio system 100 can utilize at least one of a plurality of left HRTFs 150 and a plurality of right HRTFs 152 to filter or modify the original audio signal to account for directionality and/or calculated distance. In one example, the HRTFs can utilize azimuth angle, elevation, and distance between each virtual sound source 144 and wearable audio device 102 to filter and/or attenuate the audio signals. It should be appreciated that, in one example, the left HRTFs and right HRTFs may be obtained from a predetermined database where the particular pair or singular HRTF that is chosen is chosen based on the particular relative azimuth angle and/or particular relative elevation between the devices. Thus, in some example implementations the respective HRTFs are stored as a database of filter coefficients for different azimuth angles and/or relative elevations rather than being calculated directly.

Figure 3:
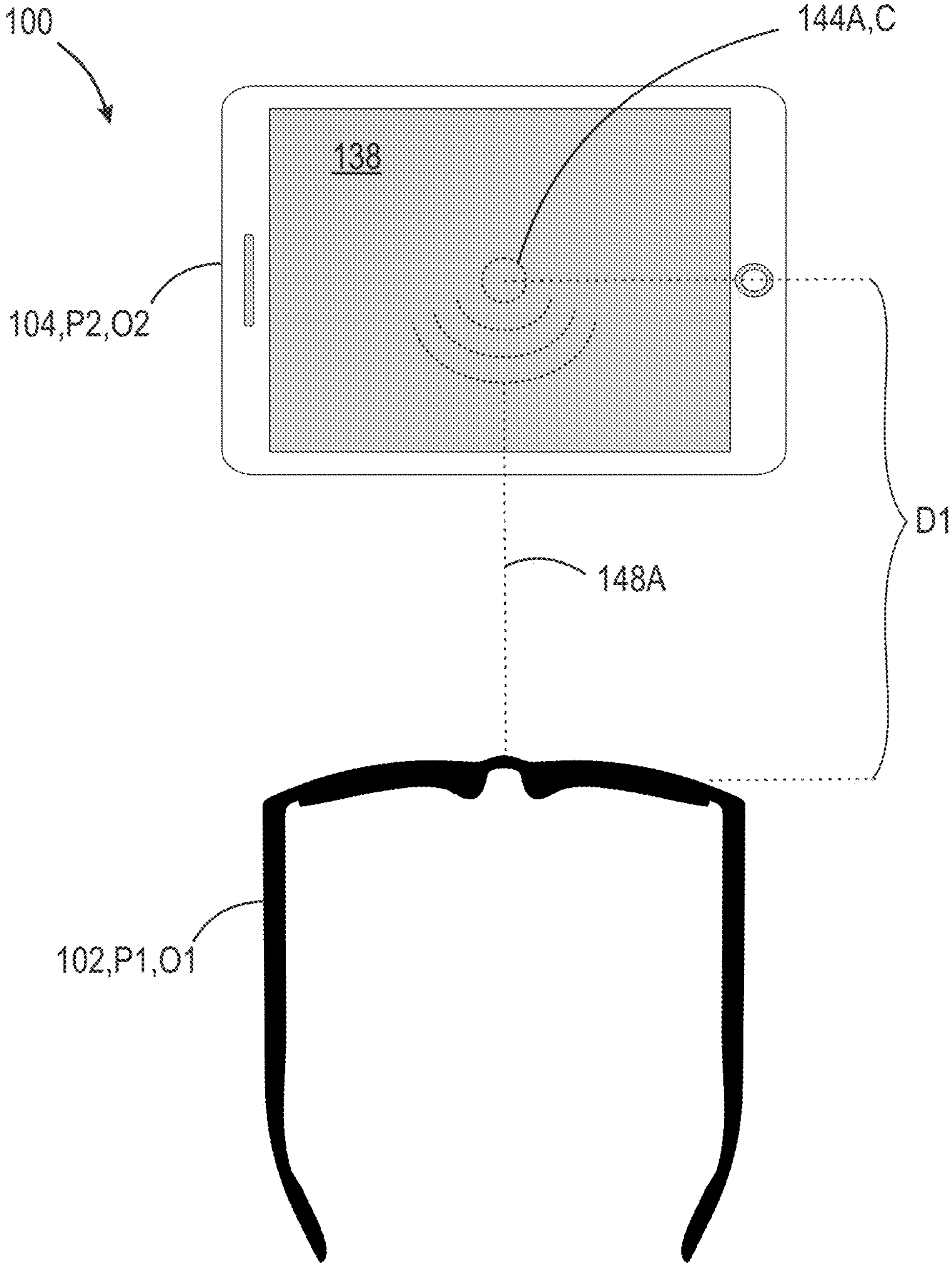
FIG. 3 is a schematic top plan view of the components of an audio system according to the present disclosure.
Figure 4:
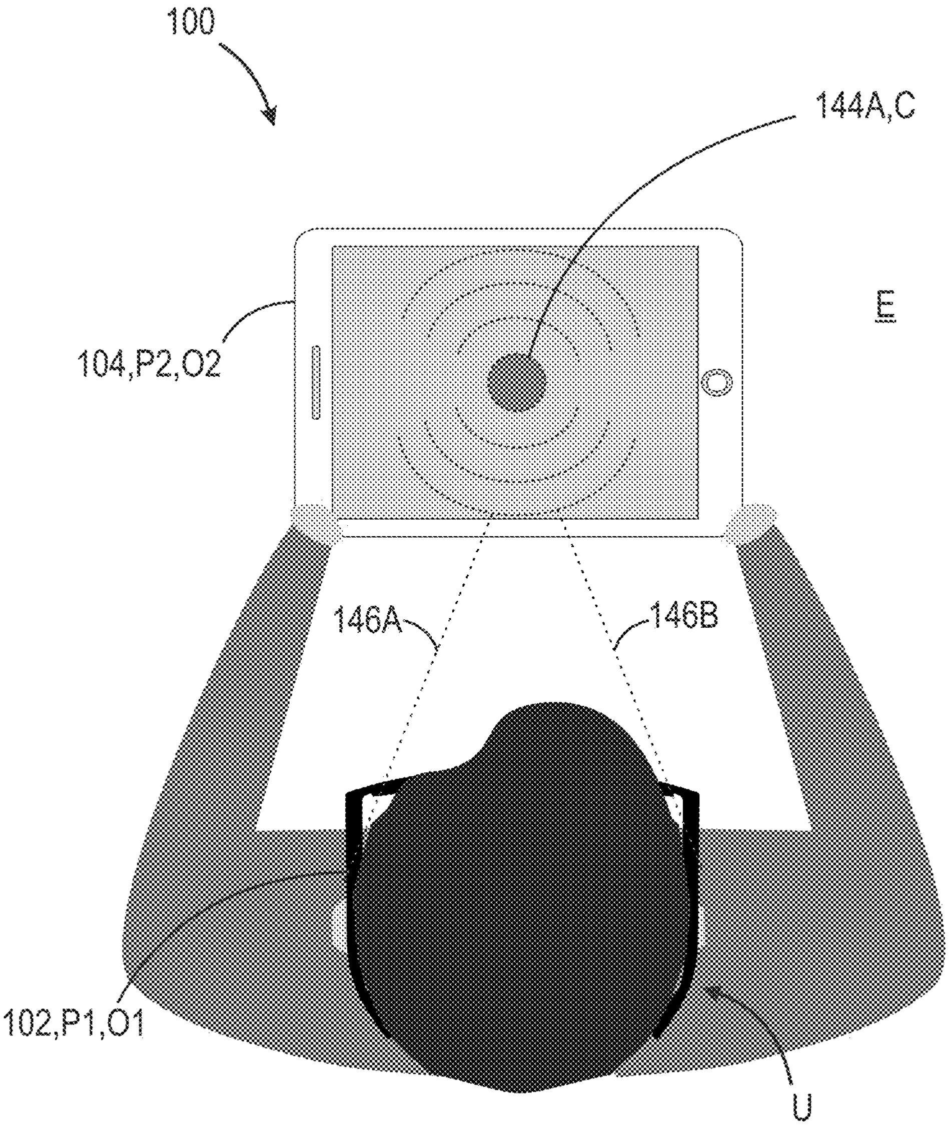
FIG. 4 is a schematic top plan view of the components of an audio system within an environment according to the present disclosure.

In one example, illustrated in FIGS. 3 and 4, audio system 100 is configured to simulate direct sound from a single virtual sound source 144A. As shown in FIG. 3, audio system 100 includes wearable audio device 102 at first position P1 and first orientation O1, and peripheral device 104 at second position P2 and second orientation O2. As shown, a single virtual sound source 144A is generated or simulated at a center C of peripheral device 104. Virtual sound source 144A is intended to simulate a center audio channel of a given audio signal along direct sound path 148A. Additionally, as the positions of wearable audio device 102 and peripheral device 104 are known relative to each other or absolutely in environment E, the position of the virtual sound source 144A is also known and therefore a distance between the first sound source 144A and the wearable audio device 102 can be calculated, e.g., as calculated distance D1 shown in FIG. 3. As discussed above, and illustrated in FIG. 4, audio system 100 can modify the audio signal to simulate center channel audio as though it was generated at a position and distance corresponding with the center C of peripheral device 104 by applying or convolving the original center channel audio signal with a left HRTF 150 and a right HRTF 152 into modified audio signals 146A-146B which can be played through left and right speakers (e.g., speakers 120A and 120B shown in FIG. 2) to simulate the direct sound path 148A from virtual sound source 144A to the user's left and right ears, respectively. It should be appreciated that, in FIG. 4, direct sound path 148A has been schematically split to illustrate how direct sound path 148A can represent both a modified audio signal 146A that has been modified by left HRTF 150 and a modified audio signal 146B that has been modified by right HRTF 152. For simplicity, the illustrations and explanations that follow will refer only to individual sound paths; however, it should be appreciated that each sound path can schematically represent two separate modified audio signals that have been modified using left and right HTRFs as discussed above.

Figure 5:
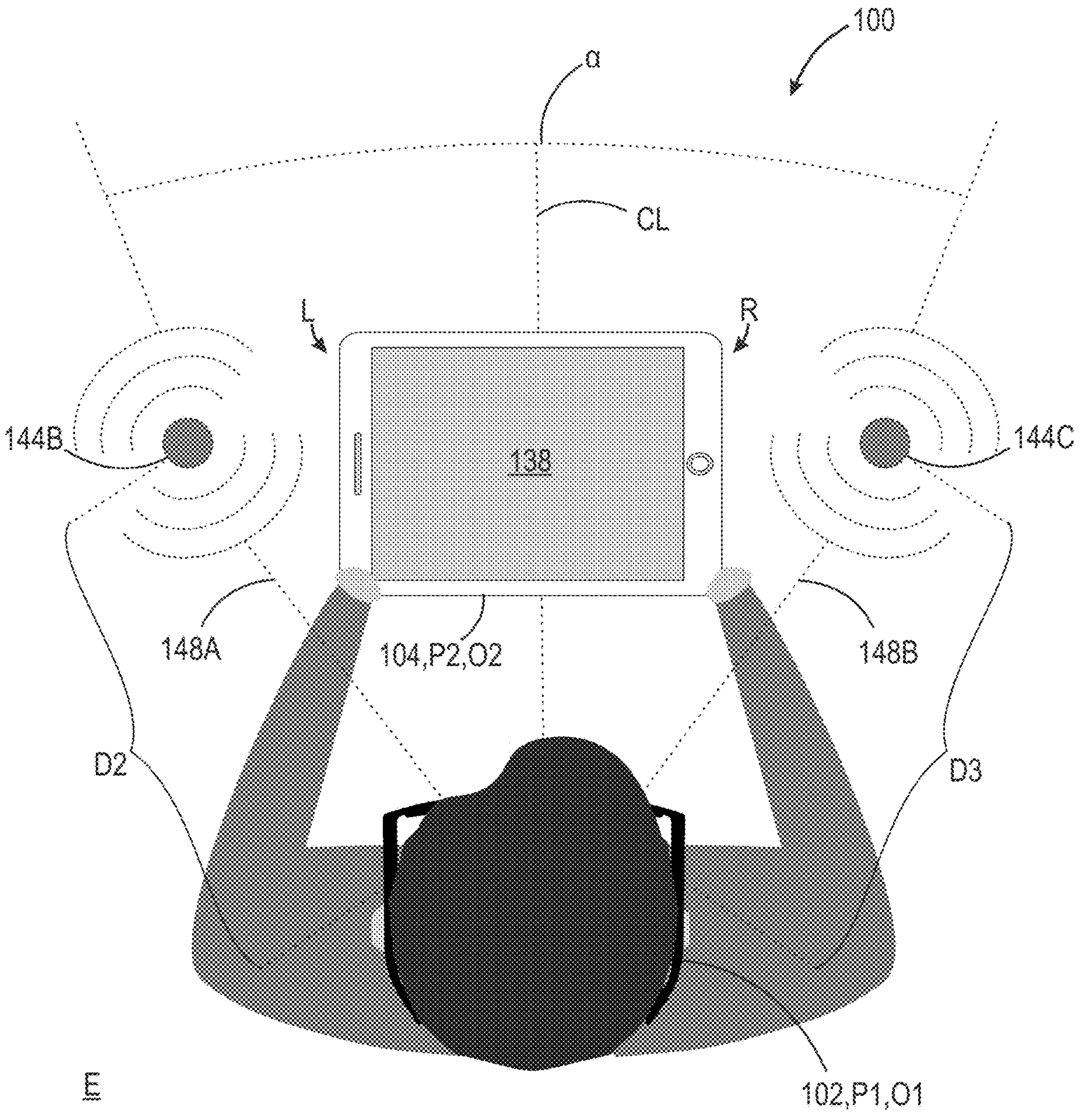
FIG. 5 is a schematic top plan view of the components of an audio system within an environment according to the present disclosure.

Similarly to virtual sound source 144A associated with a center channel audio signal, left channel and right channel audio signals may be simulated through additional virtual sound sources, e.g., 144B and 144C, as illustrated in FIG. 5. As illustrated, a virtual sound source 144B can be generated proximate to a left side L of peripheral device 104 to simulate left channel audio and a virtual sound source 144C can be generated proximate to a right side R of peripheral device 104 to simulate right channel audio. It should also be appreciated that these audio signals can be generated such that a phantom center channel is created equidistant between virtual sound sources 144B and 144C, such that simulating the center channel audio through virtual sound source 144A is not necessary. In one example, as illustrated in FIG. 5, virtual audio sources 144B and 144C can be positioned such that, when using first position P1 of wearable audio device 102 as an origin point, the angle $\alpha$ created between virtual sound sources 144B and 144C is approximately 30 degrees, e.g., −15 to +15 degrees about a center line CL. It should be appreciated that this angle can be selected from any angle within the range between 0-180 degrees, e.g., −75 to +75 degrees, −50 to +50 degrees, −30 to +30 degrees, or −5 to +5 degrees about center line CL.

Figure 6:
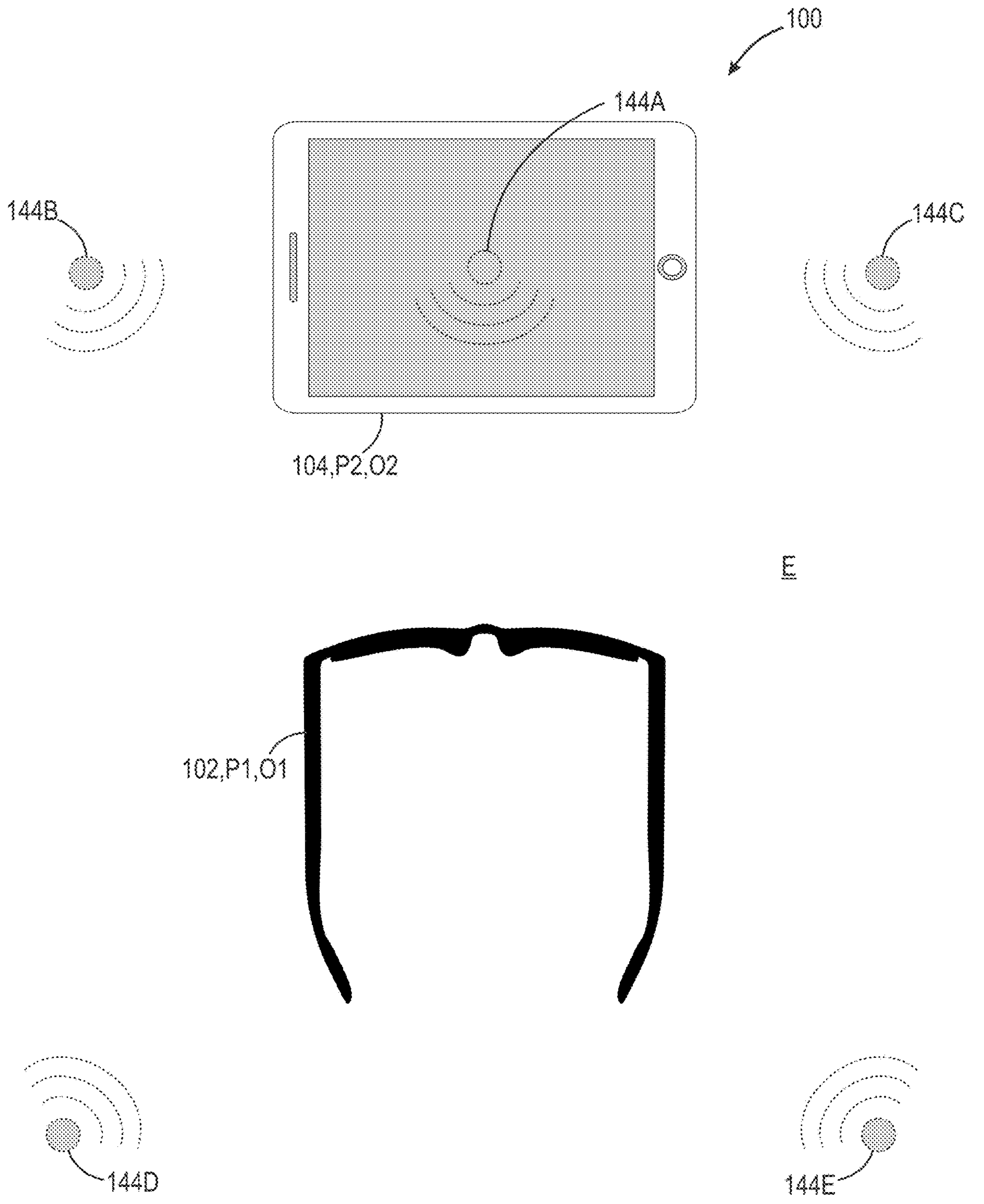
FIG. 6 is a schematic top plan view of the components of an audio system according to the present disclosure.

Additionally, other virtual sound source configurations are possible. For example, FIG. 6 illustrates a configuration of virtual sound sources 144 which simulate a 5.1 surround sound system. For example, virtual audio sources 144A-144C are simulated in space in front of wearable audio device 102 and proximate peripheral device 104 to simulate front-center, front-left, and front-right channel audio signals as discussed above. To create the 5.1 surround sound effect, two additional virtual sound sources, e.g., 144D and 144E are simulated behind the wearable audio device 102 to simulate rear-left and rear-right audio signals, respectively. It should be appreciated that other arrangements and configurations are possible, e.g., additional virtual sound sources can be added such that audio system 100 can simulate 7.1 and 9.1 surround sound systems, and although not illustrated, can also include at least one simulated subwoofer to provide simulated base channel audio.

Alternatively, and although not illustrated, it should be appreciated that one or more virtual sound sources 144 within any of the foregoing exemplary configurations may be replaced by a real sound source e.g., a real tangible speaker placed within environment E at the approximate location of the virtual sound source that it is intended to replace. For example, the center channel audio signal, rendered at the locations indicated for virtual sound source 144A, could be replaced, i.e., not generated virtually at that position and the at least one device speaker 136 can render audio playback APB at the location of peripheral device 104 where the audio playback APB only includes center channel audio. Similarly, as it may be difficult to simulate directionality of audio corresponding to a base audio channel, a real subwoofer can be placed within environment E to replace a virtual equivalent base sound source. In addition to, or in the alternative to, the foregoing, it should be appreciated that one or more virtual sound sources 144 within any of the foregoing exemplary configurations can be rendered by wearable audio device 102 without being virtualized or spatialized as discussed herein. For example, in a configuration that utilizes left, right, and center audio channels, as discussed above, audio system 100 can choose to virtualize or spatialize any of those channels by generating a virtual audio source 144 within the environment E that simulates one or more of those channels. However, audio system 100 can, in addition to, or in the alternative to spatializing one or more of those channels, render audio at the speakers of the wearable audio device 102 that is unspatialized, e.g., one or more of those channels may be rendered to audible sound by the wearable audio device 102 and perceived by the user as though it were coming from inside the user's head.

In addition, in some implementations, the techniques described herein to spatially pin audio to a given location (such as the center of the display of the peripheral device) could separate the audio to be spatially pinned by frequency and/or channel, such that portions of the audio is spatially pinned and other portions are not. For instance, the portions of the audio that relate to low frequencies, such as those for a subwoofer channel, could be excluded from being spatialized using the techniques variously described herein as those low frequencies are relatively spatially/directionally agnostic compared to other frequencies. In other words, in the case of low frequencies and/or a subwoofer channel, there is little information a user's brain can use to localize the source of the low frequencies and/or subwoofer channel, and so including those frequencies and/or that channel when transforming the audio to be spatially pinned would add computational cost with little to no psychoacoustic benefit (as the user wouldn't be able to tell where those low frequencies and/or subwoofer channel was coming from, anyway). This is why subwoofers in audio systems can generally be placed anywhere in a room, as low frequencies are directionally agnostic. In some such implementations, the techniques include separating out the frequency, channel, and/or portion (e.g., low frequencies and/or the subwoofer channel) prior to performing the spatial pinning as variously described herein, performing the spatial pinning for the remainder of the frequencies, channels, and/or portions, and then combining the non-spatially pinned aspect (e.g., low frequencies and/or the subwoofer channel) with the spatially pinned aspect (e.g., all other frequencies and/or all other channels).

In the following examples, corresponding to FIGS. 7-9, only two virtual sound sources will be described and illustrated, i.e., virtual sound sources 144B and 144C; however, it should be appreciated that, as set forth above, other configurations having more or less virtual sound sources are possible as well as configurations having one or more subwoofers to simulate one or more base channels. As discussed above, the position and orientation of each virtual sound source 144 is pinned, locked, or otherwise spatially fixed with respect to the position and orientation of the peripheral device 104. In other words, should the peripheral device 104 move, rotate, pivot, tilt, or otherwise change position, location, or orientation within environment E or with respect to the wearable audio device 102, the plurality of virtual sound sources 144 will move, rotate, pivot, tilt, or otherwise change position, location, or orientation proportionally such that the position and orientation of each virtual sound source 144 is fixed with respect to the peripheral device 104. As the devices of audio system 100 are capable of obtaining their relative positions and orientations with respect to each other or within the environment E, the distances between devices and/or virtual sound sources 144 can be utilized by the HRTFs to attenuate and/or delay the sound signals to simulate the actual time-of-flight that a real sound wave would experience when propagating through air from the position of each respective virtual sound source 144. Thus, the real world directionality as well as the real world time-delay that would be experienced by a plurality of real external sources can be simulated to the wearer, user, or listener through wearable audio device 102 by altering or modifying the original audio signals using left HRTF 150 and right HRTF 152 into modified audio signals 146A and 146B. Additionally, although in some examples, the positions of the virtual sound sources within environment E are proportionately pinned to or fixed to the position and orientation of peripheral device 104, e.g., will move, rotate, pivot, tilt, or otherwise change position, location, or orientation proportionately to movement of peripheral device 104, in some examples, the height of each virtual sound source is clamped or limited to certain heights with respect to the floor beneath the user. For example, should the user pivot peripheral device 45 degrees in a rotation that would place the screen of peripheral device substantially facing the ceiling above the user, any front virtual sound sources (e.g., in a 5.1 surround sound configuration) that have been spatialized or virtualized on the opposing side or back side of the position of the peripheral device will pivot proportionately, and may be proximate to or within the floor beneath the user, while the rear virtual sound sources that have been spatialized or virtualized behind the user will pivot proportionately and may be proximate to or within the ceiling above the user. Thus, in some examples, the height of the virtual sound sources, e.g., at least the front and rear simulated virtual sound sources, may be fixed or locked to a particular height from the floor, e.g., the approximate height of the wearable audio device 102 from the floor. In other example, the height of virtual sound sources may be fixed or locked relative to the height of a pedestal or other object within environment E.

Figure 7:
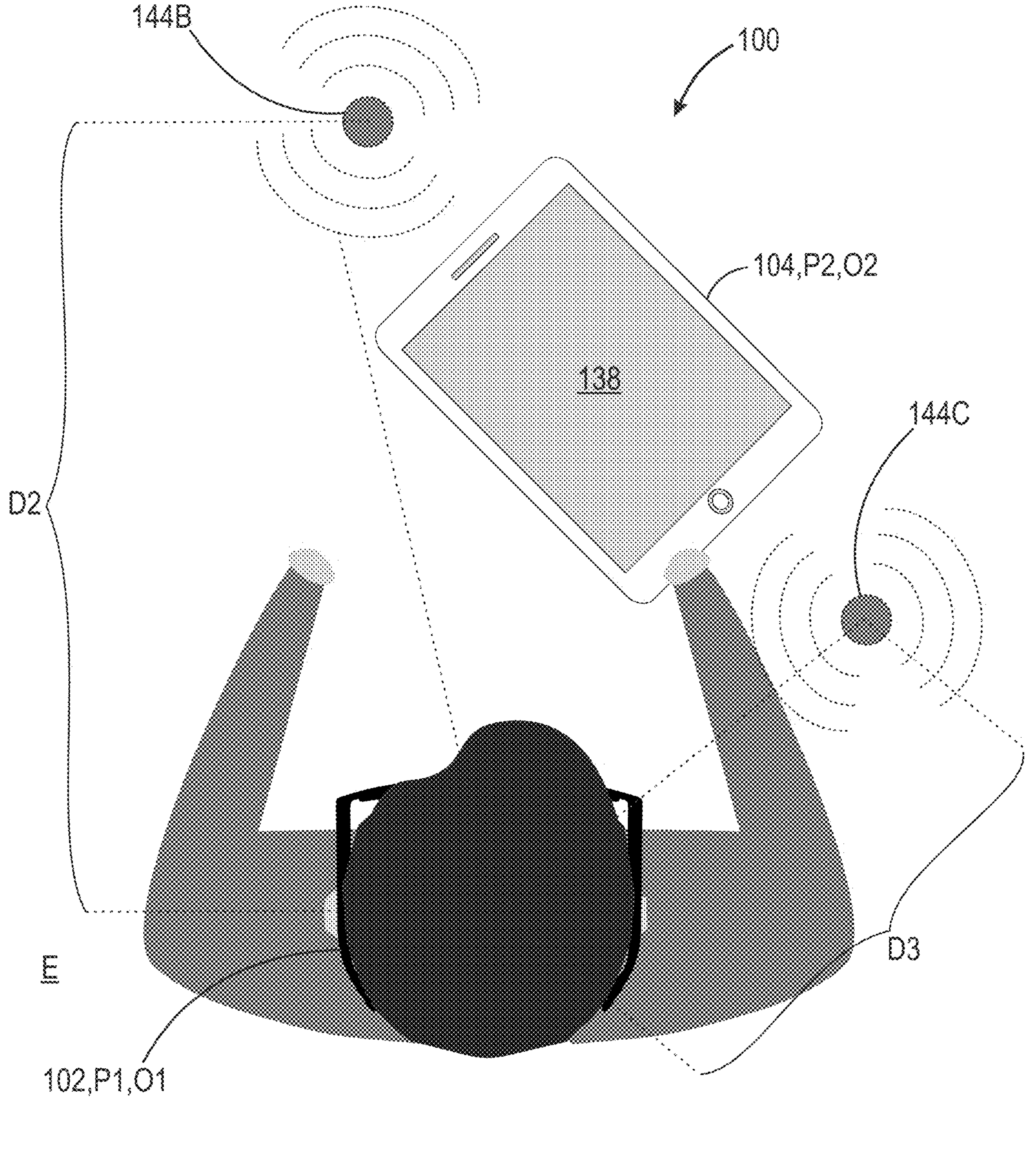
FIG. 7 is a schematic top plan view of the components of an audio system within an environment according to the present disclosure.
Figure 8:
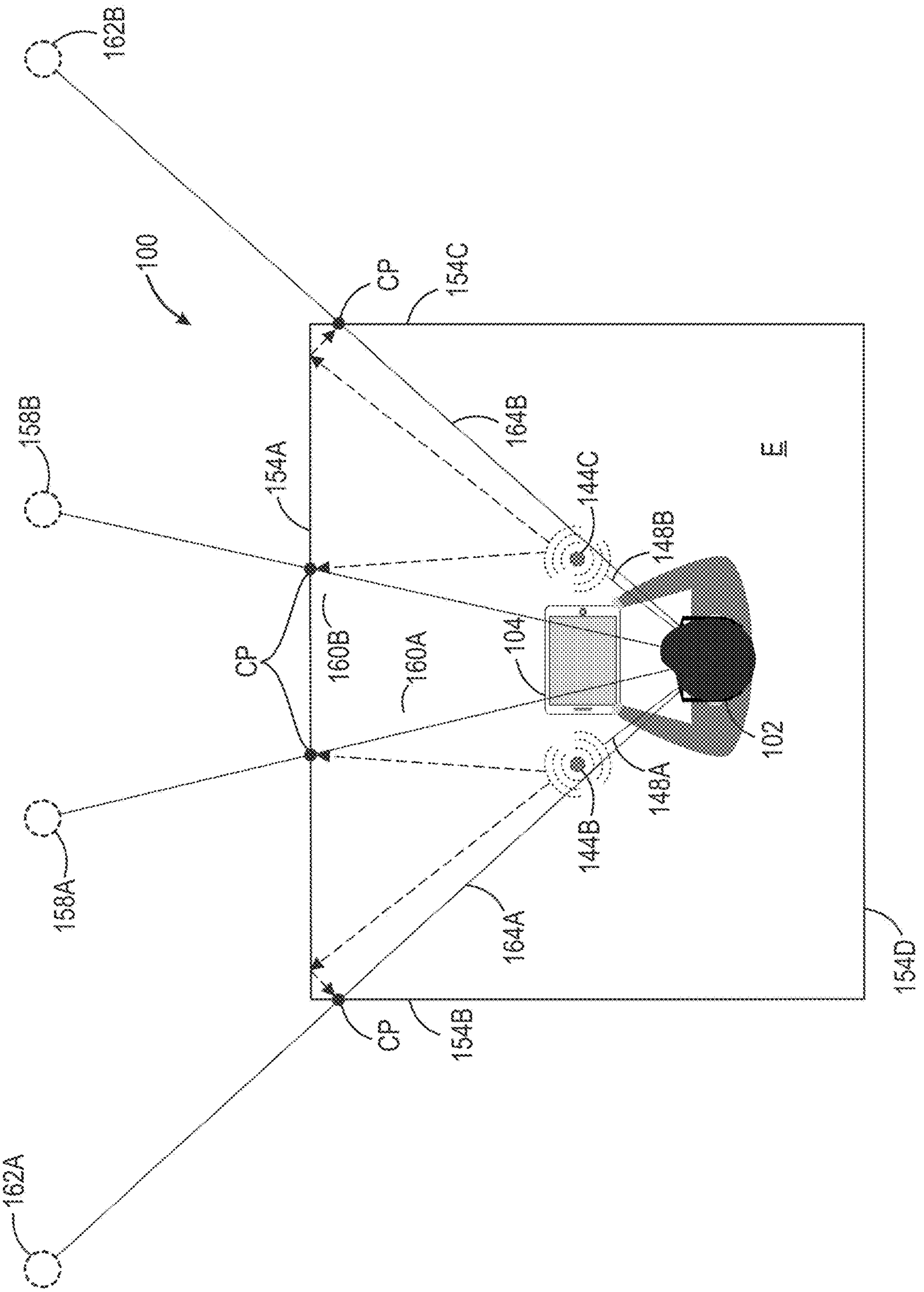
FIG. 8 is a schematic top plan view of the components of an audio system within an environment according to the present disclosure.

During operation, as illustrated in FIG. 7, audio system 100 can simulate two virtual sound sources, e.g., virtual sound sources 144B and 144C corresponding to left and right channel audio signals, where the virtual sound sources are spatially pinned, locked, or otherwise fixed with respect to second orientation O2 and second position P2 of peripheral device 104. As illustrated, should the user rotate or otherwise alter the orientation of peripheral device 104, e.g., rotate peripheral device 104 clockwise approximately 45 degrees about second position P2, the position of virtual sound sources 144B and 144C will revolve at fixed distances from the peripheral device 104 and about position P2 approximately 45 degrees such that after rotation of peripheral device 104, the positions of virtual sound sources 144B and 144C with respect to peripheral device 104 are the same as they were before the rotation. Notably, by rotating the peripheral device 104 45 degrees while the user maintains their original head position, i.e., first position P1 and first orientation O1 of wearable audio device 102, the position of each virtual sound source 144B and 144C with respect to the wearable audio device 102 will be altered. For example, when rotating peripheral device 104 clockwise approximately 45 degrees, as shown in FIG. 7, virtual sound source 144B will move away from wearable audio device 102 while virtual sound source 144C will move closer to wearable audio device 102. Said another way, calculated distance D2 will increase while calculated distance D3 will decrease, as shown. Thus, to account for the rotation of peripheral device 104 with respect to wearable audio device 102, left HRTF 150 can include the change in calculated distance D2 of virtual sound source 144B to simulate an increase in distance to the wearable audio device 102 while right HRTF 152 can include the change to calculated distance D3 of virtual sound source 144C to simulate a decrease in distance to wearable audio device 102. As discussed above, it should be appreciated that any number of virtual sound sources 144 may be simulated in any of the exemplary configurations above, and each virtual sound source 144 can be spatially pinned, locked, or fixed with respect to the peripheral device 104 as disclosed herein. Furthermore, although the foregoing example merely discloses a simple rotation of peripheral device 104 45 degrees in a clockwise rotation, more complex changes in orientation or position, e.g., tilting, moving, pivoting, or any combination of these motions can be accounted for in a similar manner as described above.

In another example, audio system 100 may utilize localization data to further increase the simulated realism of the externalized and/or virtualized sound sources 144. As mentioned above, in addition to simulating direct sound paths from each virtual sound source 144, one way to increase the realism of the simulated sound is to add additional virtual sound sources 144 which simulate primary and secondary reflections that real audio sources produce when propagating sound signals reflect off of acoustically reflective surfaces and back to the user. In other words, real sound sources create spherical waves, not just directional waves, which reflect off, e.g., acoustically reflective surfaces 154A-154D (collectively referred to as "acoustically reflective surfaces 154" or "surfaces 154"), which can include but are not limited to walls, floors, ceilings, and other acoustically reflective surfaces such as furniture. Therefore, localization refers to the process of obtaining data of the immediate or proximate area or environment E surrounding the user, e.g., surrounding the wearable audio device 102 and/or the peripheral device 104, which would indicate the locations, orientations, and/or acoustically reflective properties of the objects within the user's environment E. Once located, reflective paths may be calculated between each virtual sound source 144 and each surface 154. The point where the paths contact each surface 154, herein referred to as contact points CP, can be utilized to generate a new virtual sound source which, when simulated, produces sound that simulates an acoustic reflection of the original virtual sound source 144. One way to generate these new virtual sound sources, is to create mirrored virtual sound sources for each virtual sound source, where the mirrored virtual sound sources are mirrored about the acoustically reflective surface 154 as will be described with respect to FIG. 8 below. It should be appreciated that, to aid in obtaining localization data regarding the environment E surrounding the user, wearable audio device 102, and/or peripheral device 104, audio system 100 can further include a localization module 156 (shown in FIGS. 2A and 2B) which can be provided as a separate device or may be integrated within wearable audio device 102 or peripheral device 104. For example, a separate localization module 156 can be provided where the separate localization module 156 is selected from at least one of: a rangefinder (e.g., a LIDAR sensor), a proximity sensor, a camera or plurality of cameras, a global positioning sensor (GPS), or any sensor, device, component, or technology capable of obtaining, collecting, or generating localization data with respect to the location of the user, the wearable audio device 102, the peripheral device 104, and the acoustically reflective surfaces 154. In one example, localization module 156 includes at least one camera integrated within either wearable audio device 102 or peripheral device 104, e.g., as first sensor 118 or second sensor 134. The localization module 156 can also include or employ an artificial neural network, deep learning engine or algorithm, or other machine learning algorithm trained to visually detect the acoustic properties, the locations, and the orientations of the acoustically reflective surfaces 154 within environment E from the image data captured by the camera. In another example, localization module 156 is arranged to collect data related to the reverberation time and/or acoustic decay characteristics of the environment in which the user, wearable audio device 102, or peripheral device 104 are located. For example, localization module 156 may include a dedicated speaker and can be configured to produce a specified sound signal (e.g., a "ping" or other signal outside of the range of human hearing) and measure the reflected response (e.g., with a dedicated microphone). In one example, an absorption coefficient is calculated from the reverberation time or other characteristics of the environment as whole, and applied to the acoustically reflective surfaces 154 as an approximation. If the sound signal is specifically directed or aimed at the acoustically reflective surfaces 154, then the differences between the original signal and the initially received reflections can be used to calculate an absorption coefficient of the acoustically reflective surfaces 154. In one example, localization module 156 includes a global positioning system (GPS) sensor, e.g., embedded in the wearable audio device 102 or peripheral device 104 and localization module 156 can selectably utilize data from acoustically reflective surfaces 154 that are within some threshold distance of each virtual sound source 144.

Once localization data is obtained using, e.g., localization module 156, and in addition to direct sound paths 148A and 148B discussed above, paths between each virtual sound source 144 and each acoustically reflective surface 154 can be determined. At the junction between each determined path and each acoustically reflective surface 154, there is a contact point CP. In one example, as illustrated in FIG. 8 in a top plan view of audio system 100 within environment E, audio system 100 includes primary mirrored virtual sound sources 158A and 158B (collectively referred to as "primary mirrored virtual sound sources 158" or primary mirrored sources 158"). Each primary mirrored virtual sound source 158, is a new virtual sound source generated at a position equivalent to the position of the original virtual sound source 144 and mirrored about an acoustically reflective surface 154. For example, as illustrated, a path (shown by a dashed line in FIG. 8) between virtual sound source 144B and acoustically reflective surface 154A (illustrated as a wall), is determined. The point where the determined path meets acoustically reflective surface 154A is labelled as a contact point CP. A copy of virtual sound source 144B is generated as primary mirrored virtual sound source 158A at a position equivalent to the position of virtual sound source 144B after being mirrored about acoustically reflected surface 154A. Once generated at the position illustrated, simulated sound generated from the position of this primary mirrored sound source 158A, simulates a first order or primary reflected sound path 160A (shown by a dotted line in FIG. 8) which simulates sound from virtual sound source 144B as though it was generated within environment E and reflected off acoustically reflective surface 154A to the location of the user's ears, i.e., the approximate location of wearable audio device 102. Similar paths can be determined and simulated to generate a primary mirrored virtual sound source 158B corresponding to a first order or primary reflected sound path 160B for virtual sound source 144C.

Similarly, audio system 100 can generate secondary mirrored virtual sound sources 162A-162B (collectively referred to as "secondary mirrored virtual sound sources 162" or secondary mirrored sources 162"). Each secondary mirrored virtual sound source 162, is a new virtual sound source generated at a position equivalent to the position of the original virtual sound source 144 and mirrored about a different acoustically reflective surface 154. For example, as illustrated, a two-part path (shown by two dashed lines in FIG. 8), i.e., where a first part extends from virtual sound source 144B to acoustically reflective surface 154A (illustrated as a wall), and a second part extends from the termination of the first part of the path to a second acoustically reflective surface 154B (illustrated as a wall) is determined. The point where the second part of the determined path meets acoustically reflective surface 154B is labelled as a contact point CP. A copy of virtual sound source 144B is generated as secondary mirrored virtual sound source 162A at a position equivalent to the position of virtual sound source 144B after being mirrored about acoustically reflected surface 154B. Once generated at the position illustrated, simulated sound generated from the position of this secondary mirrored sound source 162A, simulates a second order or secondary reflected sound path 164A (shown by a dotted line in FIG. 8) which simulates sound from virtual sound source 144B as though it was generated within environment E and reflected off acoustically reflective surface 154A and acoustically reflected surface 154B to the location of the user's ears, i.e., the approximate location of wearable audio device 102. Similar paths can be determined and simulated to generate a secondary mirrored virtual sound source 162B corresponding to a second order or secondary reflected sound path 164B reflected off acoustically reflective surface 154A and acoustically reflective surface 154C to simulate second order reflected audio of virtual sound source 144C.

Similarly to the example described above with respect to FIG. 7, the primary mirrored virtual sound sources 158 and the secondary mirrored virtual sound sources 162 are pinned or otherwise spatially locked with respect to the orientation and position of peripheral device 104. In other words, should the peripheral device 104 move, rotate, pivot, tilt, or otherwise change position, location, or orientation within environment E or with respect to the wearable audio device 102, the plurality of virtual sound sources 144 within environment E will move, rotate, pivot, tilt, or otherwise change position, location, or orientation proportionally such that the position and orientation of each virtual sound source 144 is fixed with respect to the peripheral device 104. As the locations, position, and/or orientations of the virtual sound sources 144 will change with peripheral device 104, each primary mirrored virtual sound source 158 and each secondary mirrored virtual sound source will also move such that they continue to simulate reflections of virtual sound sources 144 about each acoustically reflective surface.

It should be appreciated that primary reflected sound paths 160 and secondary reflected sound paths 164 can be simulated using primary mirrored virtual sound sources 158 and secondary mirrored virtual sound sources 162 for every virtual sound source configuration discussed above, e.g., 5.1, 7.1, and 9.1 surround sound configurations as well as configurations which include at least one virtual subwoofer associated with base channel audio signals. Additionally, the present disclosure is not limited to primary and secondary reflections. For example, higher order reflections are possible, e.g., third order reflections, fourth order reflections, fifth order reflections, etc., are possible; however, as additional order reflections and therefore the number of virtual sound sources simulated increases, the computational processing power and processing time scales exponentially. In one example, audio system 100 is configured to simulate six virtual sound sources 144, e.g., corresponding to a 5.1 surround sound configuration. For each virtual sound source 144, a direct sound path 148 is calculated. For each virtual sound source 144 there are six first order or primary reflected sound paths 160, corresponding to a first order reflection off of four walls, a ceiling, and a floor (e.g., acoustically reflective surfaces 154). Each first order reflected path may again reflect off of the other five remaining surfaces 154 producing an exponential number of virtual sources and reflected sound paths. It should be appreciated that, in some example implementations of audio system 100, the number of second order reflections 164 is dependent on the geometry of the environment E, e.g., the shape of the room with respect to the position of the wearable audio device 102 and the virtual sound sources 144. For example, in a rectangular room geometry, once a first order or primary reflected sound path 160 is selected, certain second order reflections 164 may not be physically possible, e.g., where the contact points CP would need to be positioned outside of the room to obtain a valid second order reflection path. Thus, in an example with a rectangular room geometry, it should be appreciated that rather than simulating five secondary reflected sound paths 164 for each first order reflected sound path 160, only three secondary reflected sound paths 164 may be simulated to account for invalid second order reflections 164 caused by the particular room geometry. For example, rather than simulating six first order reflections 160 and thirty second order reflections 164 (e.g., where each of the six first order sound paths 160 are each reflected off of the five remaining walls), audio system 100 can simulate six first order reflections 160 and only eighteen secondary reflected sound paths 164 (e.g., each of the six first order reflections 160 off of three of the five remaining walls). It should also be appreciated that audio system 100 can be configured to perform a validity test across all simulated paths to ensure that the path from each simulated source to, e.g., the wearable audio device 102 is a valid path, i.e., is physically realizable dependent on the geometry of the environment E.

Additionally, due to the potential processing power required to generate these first order and second order reflections in real-time, in one example, audio system 100 utilizes the processing capacity of second circuitry 122 of peripheral device 104, e.g., using second processor 124, second memory 126 and/or second set of non-transitory computer-readable instructions 128. However, it should be appreciated that, in some example implementations of audio system 100, audio system 100 can utilize the processing capacity of first circuitry 106 of wearable audio devices 102 to simulate the first and second order reflected sound sources discussed herein, e.g., using first processor 108, first memory 110, and/or first set of non-transitory computer-readable instructions 112. Furthermore, it should be appreciated that audio system 100 can split the processing load between first circuitry 106 and second circuitry 122 in any conceivable combination.

Figure 9:
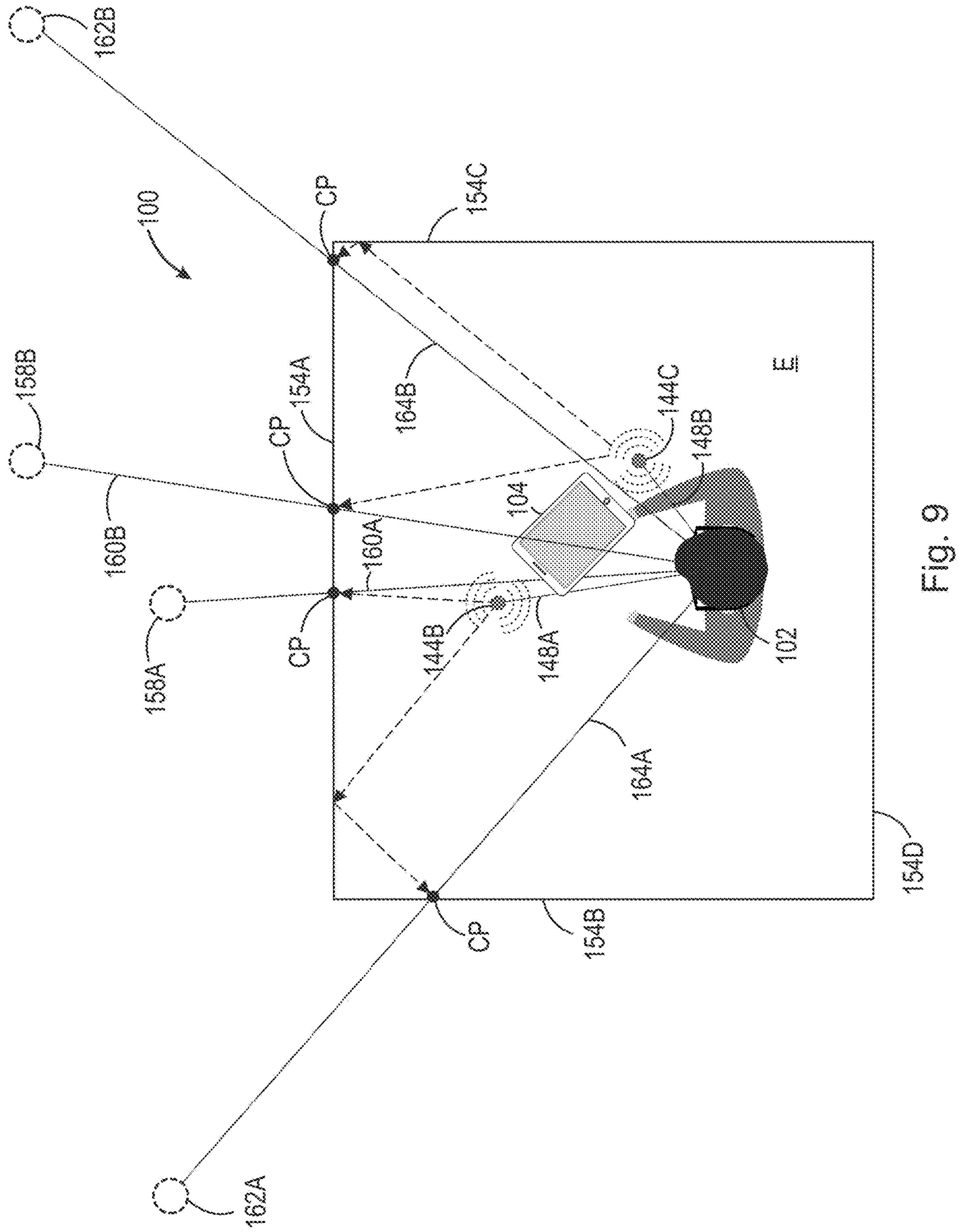
FIG. 9 is a schematic top plan view of the components of an audio system within an environment according to the present disclosure.

During operation, as illustrated in FIG. 9, audio system 100 can simulate two virtual sound sources, e.g., virtual sound sources 144B and 144C corresponding to left and right channel audio signals, where the virtual sound sources are spatially pinned, locked, or otherwise fixed with respect to second orientation O2 and second position P2 of peripheral device 104. As illustrated, should the user rotate or otherwise alter the orientation of peripheral device 104, e.g., rotate peripheral device 104 clockwise approximately 45 degrees about second position P2, the position of virtual sound sources 144B and 144C will revolve at fixed distances from the peripheral device 104 and about position P2 approximately 45 degrees such that after rotation of peripheral device 104, the positions of virtual sound sources 144B and 144C with respect to peripheral device 104 are the same as they were before the rotation. Notably, by rotating the peripheral device 104 45 degrees while the user maintains their original head position, i.e., first position P1 and first orientation O1 of wearable audio device 102, the positions of each virtual sound source 144B and 144C, the positions of each primary mirrored sound source 158, and the positions of each secondary mirrored sound source 162 with respect to the wearable audio device 102 will be altered. For example, when rotating peripheral device 104 clockwise approximately 45 degrees, as shown in FIG. 9, virtual sound source 144B will move away from wearable audio device 102 while virtual sound source 144C will move closer to wearable audio device 102. Additionally, these changes result in proportional mirrored changes to each primary mirrored virtual sound source 158 and each secondary mirrored virtual sound source 162 to account for movement of the virtual sound sources 144 with respect to the position P1 of wearable audio device 102. Thus, at least one left HRTF 150 can include the change in the calculated distance of virtual sound source 144B to simulate an increase in distance to the wearable audio device 102, at least one left HRTF 150 can include the change in the calculated distance of primary mirrored virtual sound source 158A to simulate an increase in distance to the wearable audio device 102, and at least one left HRTF 150 can include the change in the calculated distance of secondary mirrored virtual sound source 162A to simulate an increase in distance to the wearable audio device 102. Similarly, at least one right HRTF 150 can include the change in the calculated distance of virtual sound source 144B to simulate an increase in distance to the wearable audio device 102, at least one left HRTF 150 can include the change in the calculated distance of primary mirrored virtual sound source 158A to simulate an increase in distance to the wearable audio device 102, and at least one left HRTF 150 can include the change in the calculated distance of secondary mirrored virtual sound source 162A to simulate an increase in distance to the wearable audio device 102. Similar modifications can be made using left HRTFs 150 and right HRTFs 152 based on the changes in position and/or orientation of virtual sound source 144C. Furthermore, although the foregoing example merely discloses a simple rotation of peripheral device 104 45 degrees in a clockwise rotation, more complex changes in orientation or position, e.g., tilting, moving, pivoting, or any combination of these motions can be accounted for in a similar manner as described above.

Figure 10:
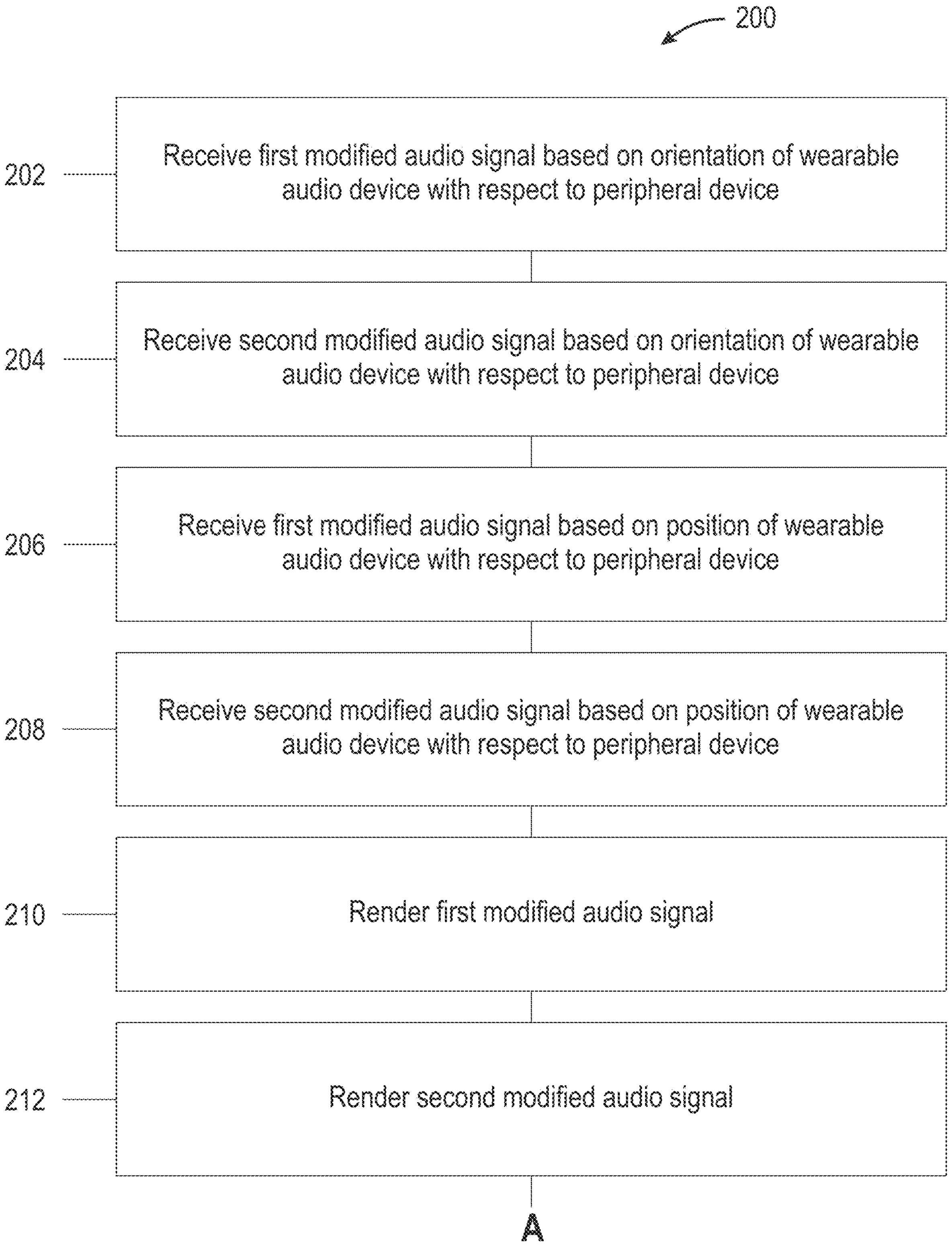
FIG. 10 is a flow chart illustrating the steps of a method according to the present disclosure.
Figure 11:
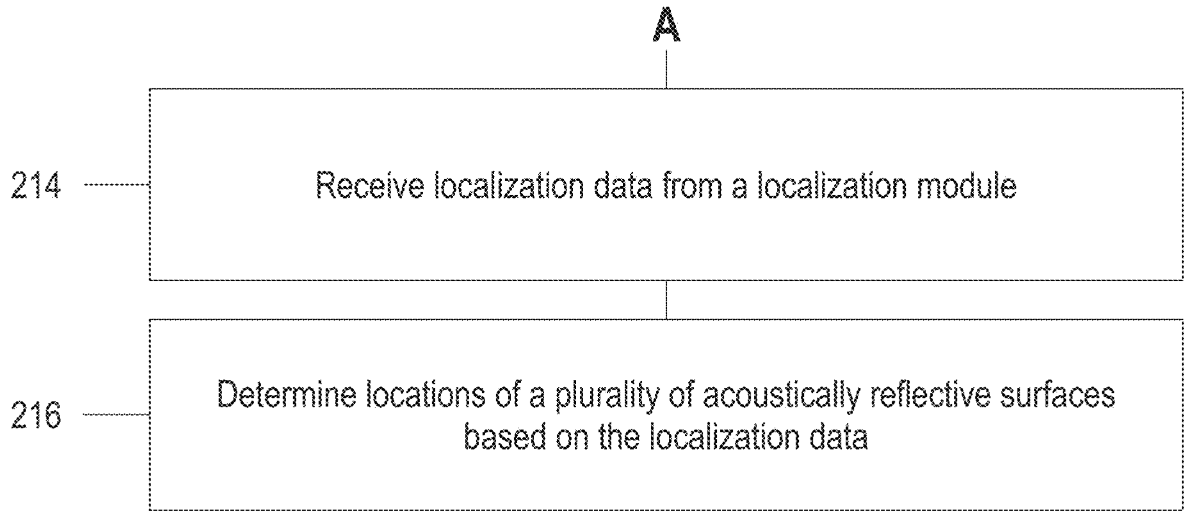
FIG. 11 is a flow chart illustrating the steps of a method according to the present disclosure.

FIGS. 10 and 11 illustrate exemplary steps of method 200 according to the present disclosure. Method 200 includes, for example: receiving, via a wearable audio device 102 from a peripheral device 104, a first modified audio signal 146A, wherein the first modified audio signal 146A is modified using a first head-related transfer function (HRTF) 150 based at least in part on an orientation O1 of the wearable audio device 102 relative to the peripheral device 104 (step 202); receiving, via the wearable audio device 102 from the peripheral device 104, a second modified audio signal 146B, wherein the second modified audio signal 146B is modified using a second head-related transfer function (HRTF) 152 based at least in part on the orientation O1 of the wearable audio device 102 relative to the peripheral device 104 (step 204); obtaining a position P1 of a wearable audio device 102 relative to the peripheral device 104 within an environment E and wherein modifying the first modified audio signal 146A and modifying the second modified audio signal 146B are based at least in part on a calculated distance D1-D3 between the position P1 of the wearable audio device 102 and a position P2 of the peripheral device 104 (step 206); obtaining an orientation O2 of the peripheral device 104 relative to the wearable audio device 102, wherein the first HRTF 150 and the second HRTF 152 are based in part on the orientation O2 of the peripheral device 104 (step 208); rendering the first modified audio signal 146A using a first speaker 120A of the wearable audio device 102 (step 210); and rendering the second modified audio signal 146B using a second speaker 120B of the wearable audio device 102 (step 212). Optionally, method 200 may further include: receiving localization data from a localization module 156 within the environment E (step 214); and determining locations of a plurality of acoustically reflective surfaces 154 within the environment E based on the localization data (step 216).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer program product for generating modified audio signals, the computer program product including a set of non-transitory computer-readable instructions stored in memory, the set of non-transitory computer-readable instructions being executable on at least one processor and configured to:

receive an audio signal at a device;

separate the audio signal into a pre-spatialized audio portion and a non-spatialized audio portion, wherein the pre-spatialized audio portion corresponds to a first frequency range and the non-spatialized audio portion corresponds to a second frequency range, and wherein each frequency of the first frequency range is greater than each frequency of the second frequency range;

track a movement of the device;

generate a first spatialized audio signal to spatialize the pre-spatialized audio portion, wherein the first spatialized audio signal is generated using a first head-related transfer function (HRTF) and the movement of the device;

generate a second spatialized audio signal to spatialize the pre-spatialized audio portion, wherein the second spatialized audio signal is generated using a second HRTF and the movement of the device, the second HRTF different from the first HRTF;

cause a combination of the first spatialized audio signal and the non-spatialized audio portion to be rendered using a first speaker of the device; and cause a combination of the second spatialized audio signal and the non-spatialized audio portion to be rendered using a second speaker of the device.

2. The computer program product of claim 1, wherein the movement of the device includes a rotational orientation of the device.

3. The computer program product of claim 1, wherein the movement of the device includes a change in position of the device within an environment.

4. The computer program product of claim 1, wherein the tracking of the movement of the device is performed using at least one of a gyroscope, an accelerometer, a magnetometer, a global positioning sensor (GPS), a proximity sensor, a microphone, a lidar sensor, or a camera.

5. The computer program product of claim 1, wherein the spatializing of the audio signal includes simulating at least two virtual sound sources.

6. The computer program product of claim 5, wherein the at least two virtual sound sources include a discrete, extracted, or phantom center channel.

7. The computer program product of claim 5, wherein the at least two virtual sound sources include a virtual surround sound system, and wherein the virtual surround sound system includes virtual height channels.

8. The computer program product of claim 1, wherein the spatializing of the audio signal includes first order acoustic reflections.

9. A device comprising:

a first speaker;

a second speaker; and at least one processor configured to:

track a movement of the device, separate the audio signal into a pre-spatialized audio portion and a non-spatialized audio portion, wherein the pre-spatialized audio portion corresponds to a first frequency range and the non-spatialized audio portion corresponds to a second frequency range, and wherein each frequency of the first frequency range is greater than each frequency of the second frequency range, generate a first spatialized audio signal to spatialize the pre-spatialized audio portion of an audio signal, wherein the first spatialized audio signal is generated using a first head-related transfer function (HRTF) and the movement of the device, generate a second spatialized audio signal to spatialize the pre-spatialized audio portion of the audio signal, wherein the second spatialized audio signal is generated using a second HRTF and the movement of the device, the second HRTF different from the first HRTF, cause a combination of the first spatialized audio signal and the non-spatialized audio portion to be rendered using the first speaker, and cause a combination of the second spatialized audio signal and the non-spatialized audio portion to be rendered using the second speaker.

10. The device of claim 9, wherein the movement of the device includes a rotational orientation of the device.

11. The device of claim 9, wherein the movement of the device includes a change in position of the device within an environment.

12. The device of claim 9, wherein the tracking of the movement of the device is performed using at least one of a gyroscope, an accelerometer, a magnetometer, a global positioning sensor (GPS), a proximity sensor, a microphone, a lidar sensor, or a camera.

13. The device of claim 9, wherein the spatializing of the audio signal includes simulating at least two virtual sound sources, wherein the at least two virtual sound sources include a discrete, extracted, or phantom center channel.

14. The device of claim 9, wherein the at least two virtual sound sources include a virtual surround sound system, wherein the virtual surround sound system includes virtual height channels.

15. The device of claim 9, wherein the spatializing of the audio signal includes first order acoustic reflections.

16. A method for generating modified audio signals comprising:

receiving an audio signal at a device;

separating the audio signal into a pre-spatialized audio portion and a non-spatialized audio portion, wherein the pre-spatialized audio portion corresponds to a first frequency range and the non-spatialized audio portion corresponds to a second frequency range, and wherein each frequency of the first frequency range is greater than each frequency of the second frequency range;

tracking a movement of the device;

generating a first spatialized audio signal to spatialize the pre-spatialized audio portion, wherein the first spatialized audio signal is generated using a first head-related transfer function (HRTF) and the movement of the device;

generating a second spatialized audio signal to spatialize the pre-spatialized audio portion, wherein the second spatialized audio signal is generated using a second HRTF and the movement of the device, the second HRTF different from the first HRTF;

causing a combination of the first spatialized audio signal and the non-spatialized audio portion to be rendered using a first speaker of the device; and causing a combination of the second spatialized audio signal and the non-spatialized audio portion to be rendered using a second speaker of the device.

17. The method of claim 16, wherein the spatializing of the audio signal includes simulating at least two virtual sound sources.

18. The computer program product of claim 1, wherein the non-spatialized audio portion corresponds to a subwoofer channel.

19. The device of claim 9, wherein the non-spatialized audio portion corresponds to a subwoofer channel.

20. The method of claim 16, wherein the non-spatialized audio portion corresponds to a subwoofer channel.

* * * * *